US 7,966,638 B2

(12) United States Patent
Gossweiler, III et al.

(10) Patent No.: US 7,966,638 B2
(45) Date of Patent: Jun. 21, 2011

(54) INTERACTIVE MEDIA DISPLAY ACROSS DEVICES

(75) Inventors: Richard C. Gossweiler, III, Sunnyvale, CA (US); Rohan Seth, Palo Alto, CA (US); Shumeet Baluja, Leesburg, VA (US)

(73) Assignee: Google Inc., Mountain View, CA (US)

( * ) Notice: Subject to any disclaimer, the term of this patent is extended or adjusted under 35 U.S.C. 154(b) by 497 days.

(21) Appl. No.: 12/059,245

(22) Filed: Mar. 31, 2008

(65) Prior Publication Data
US 2008/0276279 A1 Nov. 6, 2008

Related U.S. Application Data

(60) Provisional application No. 60/909,384, filed on Mar. 30, 2007.

(51) Int. Cl.
*H04N 7/173* (2006.01)
(52) U.S. Cl. ............... 725/133; 725/44; 725/46
(58) Field of Classification Search .......... 725/32, 725/35, 36, 44, 46, 133
See application file for complete search history.

(56) References Cited

U.S. PATENT DOCUMENTS

| | | | | |
|---|---|---|---|---|
| 5,883,621 A | * | 3/1999 | Iwamura ...................... 725/37 |
| 6,167,438 A | * | 12/2000 | Yates et al. .................. 709/216 |
| 6,317,881 B1 | * | 11/2001 | Shah-Nazaroff et al. ....... 725/24 |
| 7,571,458 B1 | * | 8/2009 | Eyal ........................... 725/137 |
| 7,610,358 B2 | * | 10/2009 | Benschoter et al. ........... 709/219 |
| 7,636,779 B2 | * | 12/2009 | Hayashi et al. .............. 709/224 |
| 7,761,898 B2 | * | 7/2010 | Caspi et al. .................... 725/82 |
| 2002/0056123 A1 | * | 5/2002 | Liwerant et al. .............. 725/87 |
| 2004/0044723 A1 | * | 3/2004 | Bell et al. ..................... 709/203 |
| 2005/0154764 A1 | * | 7/2005 | Riegler et al. .............. 707/104.1 |
| 2005/0188408 A1 | * | 8/2005 | Wallis et al. .................. 725/87 |
| 2005/0246752 A1 | * | 11/2005 | Liwerant et al. .............. 725/109 |
| 2006/0015925 A1 | * | 1/2006 | Logan ......................... 725/135 |
| 2007/0220552 A1 | * | 9/2007 | Juster et al. .................... 725/46 |
| 2007/0250866 A1 | * | 10/2007 | Yamada ........................ 725/58 |
| 2008/0036917 A1 | * | 2/2008 | Pascarella et al. ............ 348/702 |
| 2008/0060013 A1 | * | 3/2008 | Sarukkai et al. ............... 725/46 |
| 2008/0115169 A1 | * | 5/2008 | Ellis et al. ...................... 725/46 |
| 2008/0147711 A1 | * | 6/2008 | Spiegelman et al. ......... 707/102 |
| 2008/0155059 A1 | * | 6/2008 | Hardin et al. ................ 709/218 |
| 2009/0178081 A1 | * | 7/2009 | Goldenberg et al. .......... 725/46 |
| 2010/0071007 A1 | * | 3/2010 | Meijer ........................... 725/58 |

FOREIGN PATENT DOCUMENTS
EP 1-515-549 3/2005
WO WO 2001/50309 7/2001

OTHER PUBLICATIONS

International Preliminary Report on Patentability for Application No. PCT/US2008/058912, dated Oct. 15, 2009, 9 pages.
Abreu, J. et al. "2BeOn" Interactive television supporting interpersonal communication Proceedings of the Eurographics Workshp on Multimedia XX, XX. Jan. 1, 2002, pp. 199-208.

* cited by examiner

*Primary Examiner* — Scott Beliveau
*Assistant Examiner* — Nicholas T Corbo
(74) *Attorney, Agent, or Firm* — Fish & Richardson P.C.

(57) ABSTRACT

A computer-implemented method includes identifying a computer-based portable program module, automatically altering code in the portable program module to permit display of the module on a television-based display so that the displayed module has a substantially similar appearance on the television-based display as on a computer display, and providing the altered code for execution on a processor connected to a television-based display.

27 Claims, 19 Drawing Sheets

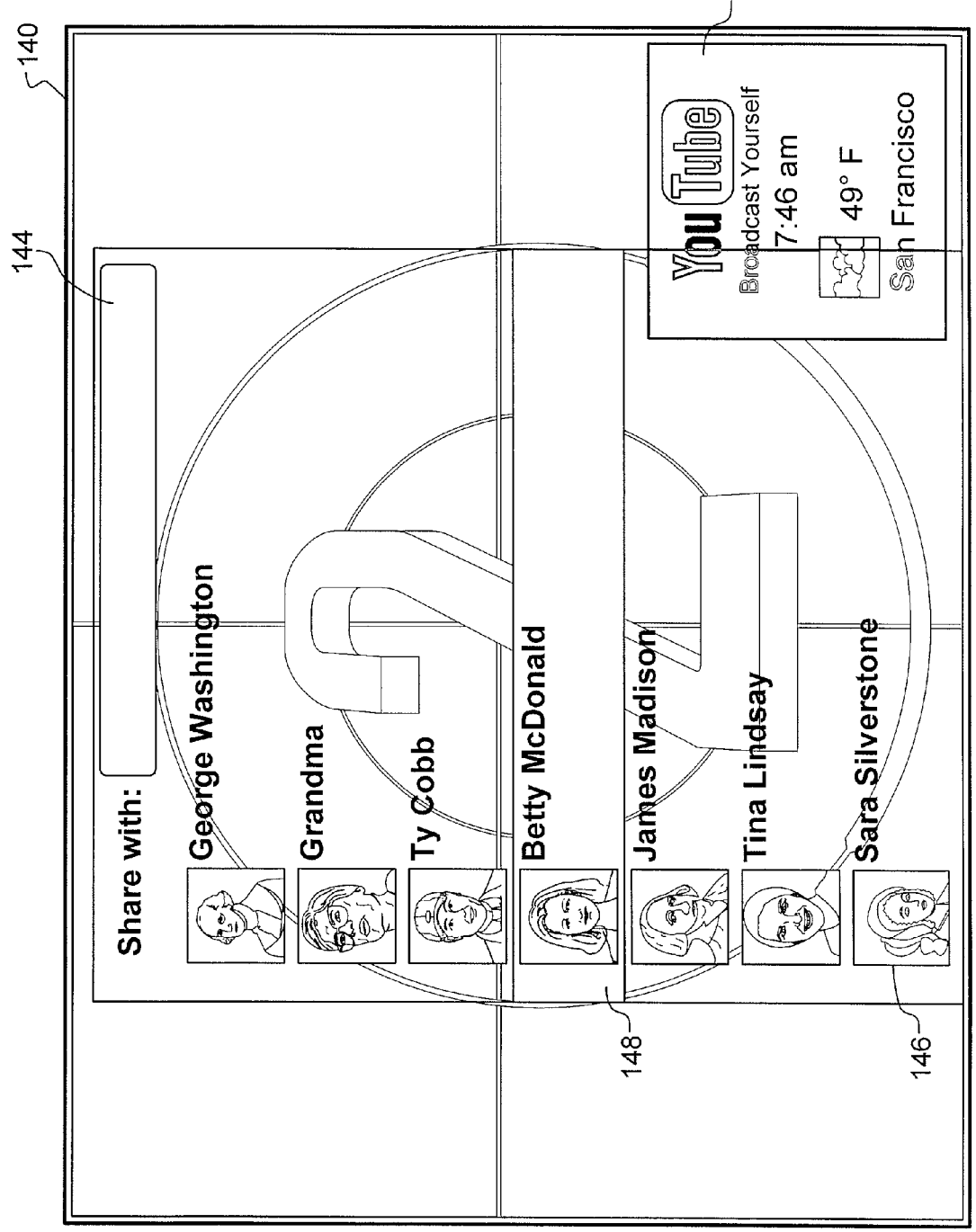

INTERACTIVE MEDIA DISPLAY ACROSS DEVICES

CROSS-REFERENCE TO RELATED APPLICATIONS

This application claims priority to U.S. Application Ser. No. 60/909,384, filed on Mar. 30, 2007, the contents of which are hereby incorporated by reference in its entirety.

TECHNICAL FIELD

This document discusses systems and methods for displaying and sharing media content and other objects for television viewing.

BACKGROUND

As the PC and the television continue to converge, both in delivery models and interaction models, we face a number of new challenges and opportunities. These devices, communicating through a network in a loosely coupled manner, will serve different and overlapping roles in presenting entertainment options. Commonly, the PC is used by the individual, used for many non-entertainment tasks and often located away from the main entertainment room. In contrast, the television is in the center of the entertainment space, often used by groups of people in various social contexts, has an impoverished input device (the remote) and has a lower resolution display. It lacks computational power, uses a different model for content distribution, and a different model for media presentation (channel-based).

Today we are seeing the beginnings of a federated model, where the PC is used to store content and the TV (or set top box) uses the local internet system to access and present the content. As computers become less expensive, some of this will move directly onto the TV—small hard drives and internet access will make TVs capable of getting at web content without requiring a PC. Nonetheless, some of the interaction is likely to remain on the PC. You may receive recommendations for video, gather content links and share links while using a PC. The TV and the PC will work in a loosely coupled fashion to support the Collect-Relate-Create-Donate (CRCD) model.

SUMMARY

This document describes various features and techniques for sharing digital content and for providing and modifying portable program modules such as widgets or gadgets. In one implementation, a computer-implemented method comprises identifying a computer-based portable program module, altering code in the portable program module to permit display of the module on a television-based display so that the displayed module has a substantially similar appearance on the television-based display as on a computer display, and providing the altered code for execution on a processor connected to a television-based display. The computer-based portable program module may comprise a gadget, and the code in the portable program module may comprise mark-up code. Altering the code can comprise altering style sheet definitions for the module. The method may also include altering graphical elements referenced by the portable program module to be dimensioned for the television-based display.

In some aspects, providing the altered code for execution comprises transmitting the code in response to a request from a remote set-top box. In addition, altering the code in the portable program module may comprise generating code responsive to navigation commands from a television remote control keypad. Generating code responsive to navigation commands can also include generating four-direction code for navigating between input elements generated by the portable program module. The method may also comprise transmitting data in response to a request from an executed portable program module, and can also comprise encoding the data as XML data.

In other aspects, the method also includes automatically altering the code in the portable program module, and requesting confirmation from a user for one or more alterations. The method can also include displaying an executed module on a computer monitor as part of a simulated television display.

In another implementation, a method of displaying content on a video monitor is disclosed, and comprises receiving, from a viewer of a television, a command for display of computer content on the television, generating a display from a portable program module with a display of media content on the television, requesting over the internet, by execution of the portable program module, data for display with the portable program module. The command may be received from a television remote control. The portable program module can comprise a gadget. Also, the portable program module can comprise mark-up code, including JavaScript referencing code. The portable program module can also comprise mark-up code for navigation of input controls on a displayed module using four-direction navigation.

In other aspects, the method further comprises positioning the display from the portable program module in a pre-selected corner of a television screen. The method may also comprise generating a plurality of displays from one or more portable program modules in an array, and the array may be a linear array. The linear array may be generated, for example, along a side edge of the television screen. The method can also include changing the display of media content from a 16:9 aspect ratio to a 4:3 aspect ratio, such as when portable program modules are displayed along one edge of the display.

In another implementation, a method of sharing media content is disclosed. The method includes receiving, from a viewer of a television, a command for display of a friend list, displaying indicators for a plurality of friends associated with a user, and receiving a selection of one or more friends from the plurality of friends, and causing an indicator of a media program playing on the television to be sent to accounts associated with the one or more friends. The indicators for a plurality of friends may each comprise a name of a friend and an image associated with the friend. The method may further comprise contacting a social networking site to obtain information identifying the plurality of friends. Also, the indicator of a media program comprises a URL pointing to the a file of the program.

In yet another implementation, a method of obtaining media content is disclosed. The method includes receiving, from a viewer of a television, a command for display of recommended media content, identifying one or more friends associated with a user of a system and displaying representations of content recommended by the one or more friends, and causing media content recommended by the one or more friends to be displayed on the television. The method may further comprise displaying indicators for a plurality of friends associated with a user and receiving a selection of one or more friends from the plurality of friends, and displaying representations of content recommended only by the selected friends. The representations of content recommended by the one or more friends can also be displayed in one or more shelves.

In some aspects, the representations of content recommended by one or more friends are displayed in a single shelf, and other recommendation are displayed in one or more other shelves. Also, causing the media content to be displayed can include causing bumper content to be displayed between adjacent pieces of media content, and the bumper content can comprise previews of following media files. The method may further comprise receiving a skip input from a user while bumper content is being displayed, and in response, causing a media file associated with the bumper content to be skipped. Also, the bumper content may comprise advertisements. In other aspects, causing media content to be displayed can comprise accessing streaming media over the internet and providing the streaming media for display on the television. The details of one or more embodiments are set forth in the accompanying drawings and the description below. Other features, objects, and advantages will be apparent from the description and drawings, and from the claims.

DESCRIPTION OF DRAWINGS

FIG. 1F is a screen shot of an interface for selecting a friend or friends with which to share a media program while watching the program.

Like reference symbols in the various drawings indicate like elements.

DETAILED DESCRIPTION

Figure 1A:
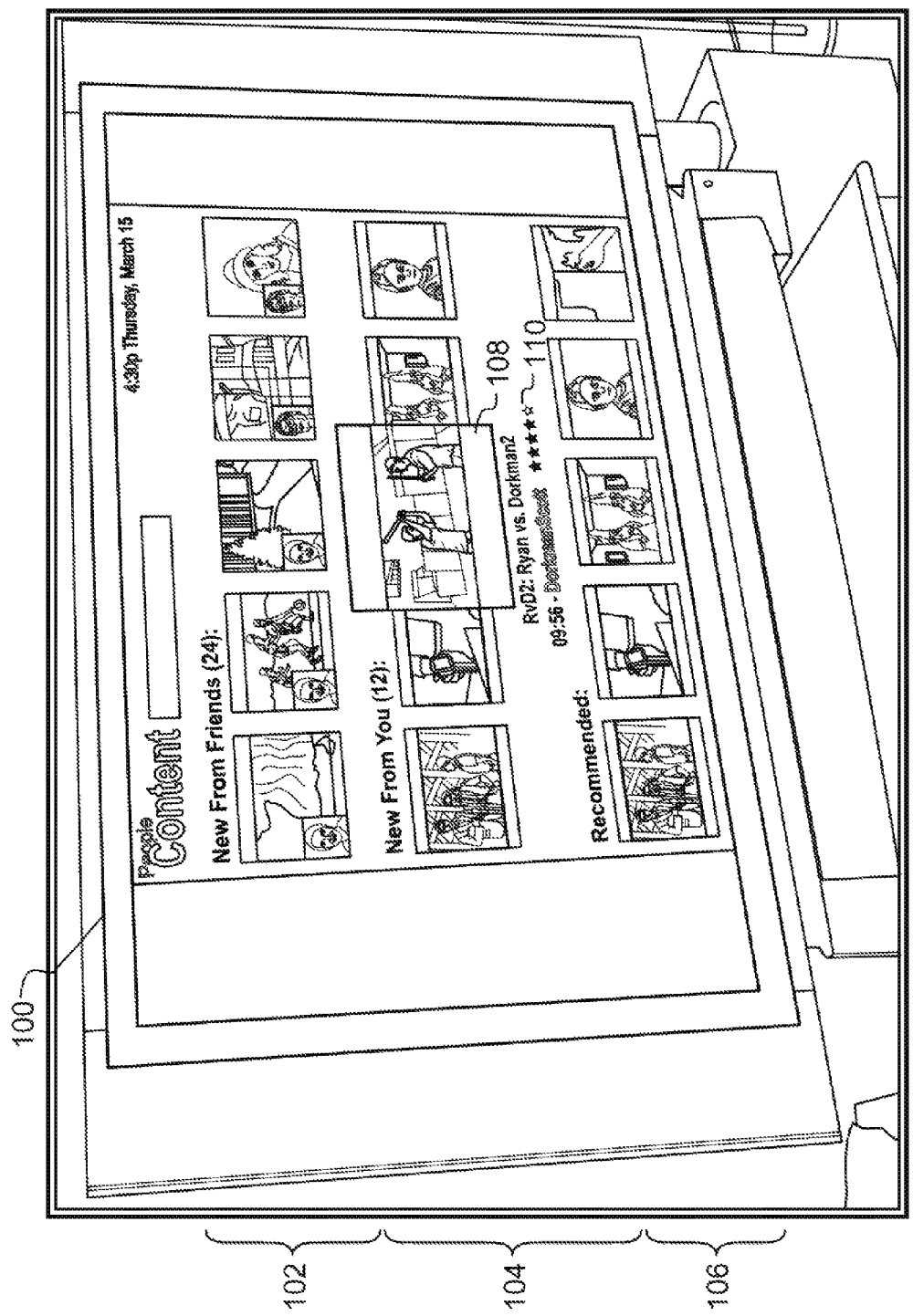
FIG. 1A shows an example television display of shelves of media content organized by the source that recommended the content.

This document addresses, among other things, three problems related to the convergence and contentions between the PC and the TV. The first problem relates to finding good content from the enormous amount of content that has suddenly become available online. The second problem relates to the delivery of online content to the entertainment environment, and the third problem relates to managing this content (viewing it, sharing it, and opening doors for other con-tent/interactions while watching television).

Problem—Finding Good Content: YOUTUBE and other such services are filled with a vast and rapidly growing library of user-generated, commercial-generated, informal, and professional-level video content. The content not only spans a broad range of topics, but also a broad range of aesthetic, visual, and semantic quality. This large, ever-changing and varying set of topics makes finding "good" videos a challenge. The "what's a good video about" discovery problem is further exacerbated by the difficulty people have in expressing what is interesting to them.

To address this problem, researchers are working on systems to automatically extract features and content tags that can be used to aid users in searching through video content. Outside of content analysis, social networks are proving to be a powerful source of information for sifting through the vast amount of content. Not only are millions of people a powerful parallel filtering system, but they can provide an invaluable source of tagging meta-data, clustering, recommendations, and popularity rankings.

One of the common mechanisms through which users find content is through email. With YOUTUBE's immense popularity and volume of content, people typically share content by emailing each other links. This points to the need to support easy sharing on the PC, and allows us to examine whether email is the best option. Email is familiar, general, great for transport and readily available. But, for a task-specific goal of sharing links with a small set of people, email may be more complicated than necessary. Email requires several steps to compose, target, and deploy the links, as well as several steps and separate tools to extract the link, resolve it to video, and view it. Because email is used for a variety of information sharing tasks, people must sift through the email or jump from one task to the next as they process email messages. Often people view videos individually and this lengthy viewing interrupts the flow of other email-related tasks. Because of this interruption, users may be less inclined to explore other videos and content, and many instead return to the task of reducing their email queue.

Problem: Delivering Content: Currently, the prevalent mode for watching internet content is streaming over the internet onto a PC. This model provides a sub-optimal viewing experience and limited range of content because of necessary bandwidth-to-latency trade-offs. We currently cannot experience high-quality, feature length films delivered in real time. Instead, we usually click on content, wait some period of time for a partial download, only to watch low fidelity content that is necessarily short and often temporally discontinuous (hitchy). For the viewer, this destroys any sense of immersion. For the content creator, this restricts the content that that they are willing to produce, the poor quality of service for streaming video beget lower quality, shorter video, and little incentive to create more than quick clips. In contrast, independent film industries have repeatedly demonstrated that there is a large, untapped reservoir of longer playing, high quality (LPHQ) content ready for consumption, but little means for unhindered mass.

Problem: Managing Content on a TV: A third problem revolves around where and when the user may want to view the content. Email typically delivers the link to a personal computing environment rather than to a social entertainment environment such as the living room. Sifting through email, extracting the video and watching it as part of an email-processing task is a very different experience than being in an entertain-me mindset, turning on a TV, watching it with a group of friends and using a remote control to navigate through the content. However, naively browsing on a TV will not work either. If the sea of internet-based, user-generated content is suddenly available on a TV (via a set top box), we will need new interaction models that deal with the amount of content and the desire to connect with the communities who share the content. This is a great opportunity for the User Interface/Experience community to pioneer beyond the pick-and-play models of PVRs today.

To address some or all of these problems, we discuss an example system that integrates the PC and the television via the internet. The hardware for the TV, in this example, is a set top box prototype that developers can construct from a low-end laptop and remote control. The example system is designed to gather content and play it though an SVGA cable to an ordinary television—though other connections such as HDMI and DVI may also be employed. This means developers can easily purchase one and start developing and extending the system without any special hardware. This also gives researchers a concrete system for developing and testing the complete experience. Other hardware solutions may also be used to perform similar functionality, including standard set top boxes and electronics integrated with a television itself.

Figure 1B:
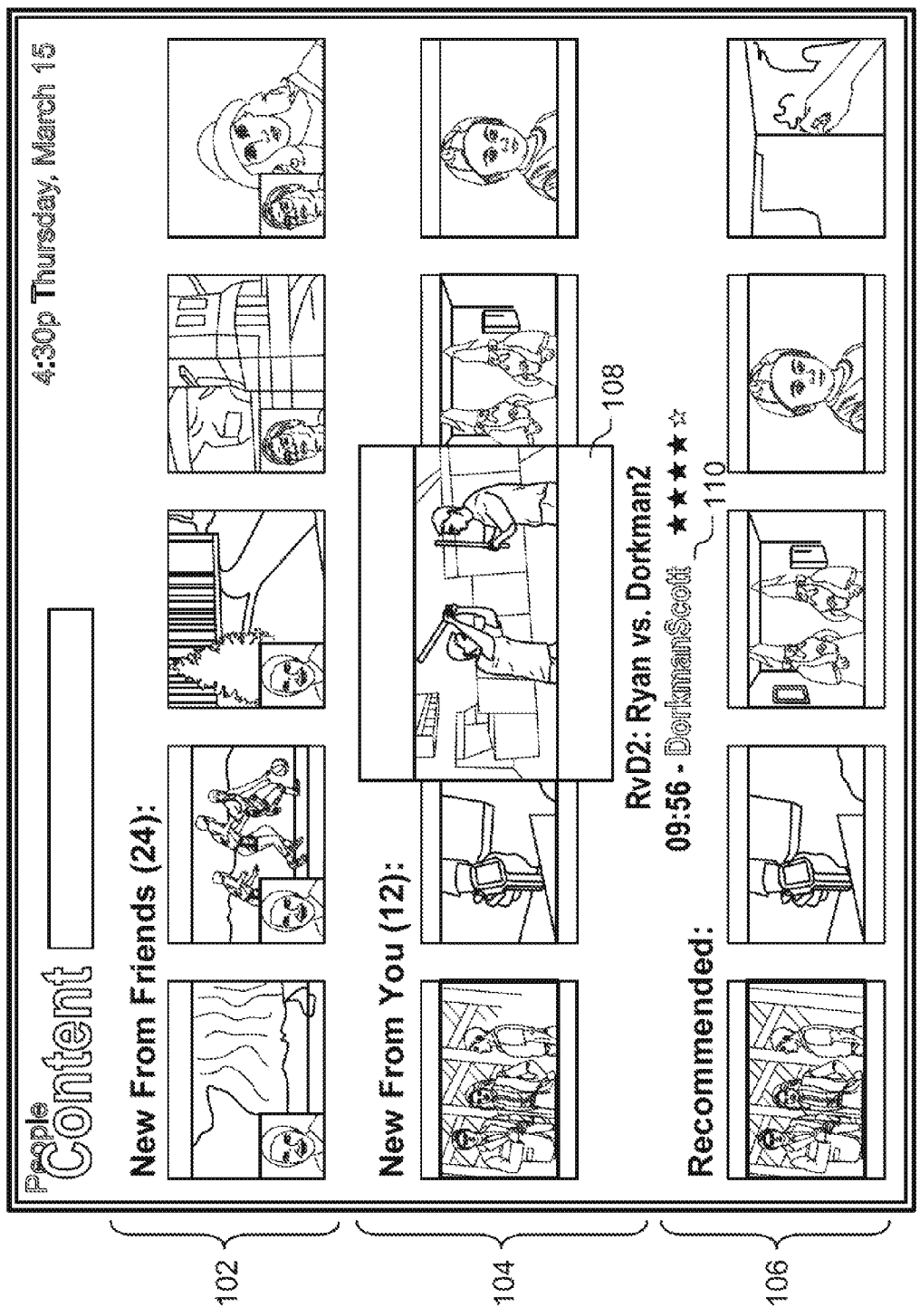
FIG. 1B shows a screen shot of shelves of recommended content for a view, with one particular file selected.

FIG. 1A shows an example television display 100 of shelves of media content organized by the source that recommended the content, using the example implementation, while FIG. 1B shows a more direct view of the display 100. In this example, a graphical user interface is displayed showing audio-visual programs that have been associated with friends, or acquaintances, of the owner of the television, where the television has been logged onto an account of the television owner. The organization of the content is in horizontal rows or shelves, where each program includes a still frame of video from the associated program, and can also include an image or other indicator of the friend from which the content was provided. Certain content may have been provided by the television owner himself, such as videos identified by the owner when he was previously using his desktop computer.

The system provides a familiar remote control interface. A user turns their device on, they see shelves of content gathered from today's (or a longer recent time) recommendations, and can easily skip or start playing along a shelf. Recommendations come from friends (their social network), from content analysis, and from persistent searches. In particular, a first shelf 102 shows programs from friends, as a horizontal row of still frames from the relevant content (audio content may show meta data about the audio file such as title, artist, and length) having a superimposed image of the friend that shared the content. The content on shelf 102 may be sorted or filtered in a variety of manners, such as by friend, where the top friends may be friends that the user has identified as people who share good content, or by comparing ratings that the user and the friends have given to common pieces of content and making a determination of co-variance in tastes between users (where higher correlation makes a friend's recommendations appear higher in the list of recommended programs).

Shelf 104 shows programs that the user himself provided. As discussed elsewhere, the user may have dragged certain content onto their device while they were surfing the web on their desktop computer, and such content would show up on shelf 104. One particular program—Ryan vs. Dorkman2—is shown in an enlarged, highlighted state with a lit border 108 in the middle of the screen 110. In this example, the user has navigated to that program through the two-dimensional grid of programs using a 4-direction controller of a television remote control.

Shelf 106 shows other recommendations, such as recommendations made automatically by the system. Such recommendations may be made, for example, by comparing a user's interests (as indicated by programs the user watches, or that the user watches without skipping out of, or that the user rates highly) to those of others, and providing recommendations of programs that similar users liked. In a similar manner, a user may establish persistent searches for content, and the recommendations may included the results of such persistent searches. For example, the user may provide a key word like "funny cat stunts," and may then be provided with all new videos that show such stunts. The persistent search may keep track of content the user has previously viewed or declined to view, or may only show content from a most recent time period, so that the user is presented only with fresh content.

The particular display shown in FIG. 1B is at a middle zoom level for displaying content on a television. If the user hits "back" on their remote control, they can be shown smaller view of the shelves. Such a "globally" zoomed view clusters shelves together. It relies on animation and pre-biasing to help recognition even when the images are very small. When the user selects a particular piece of content, the system zooms in on that piece of content to the highest zoom level of detail as shown in FIG. 1C.

Figure 1C:
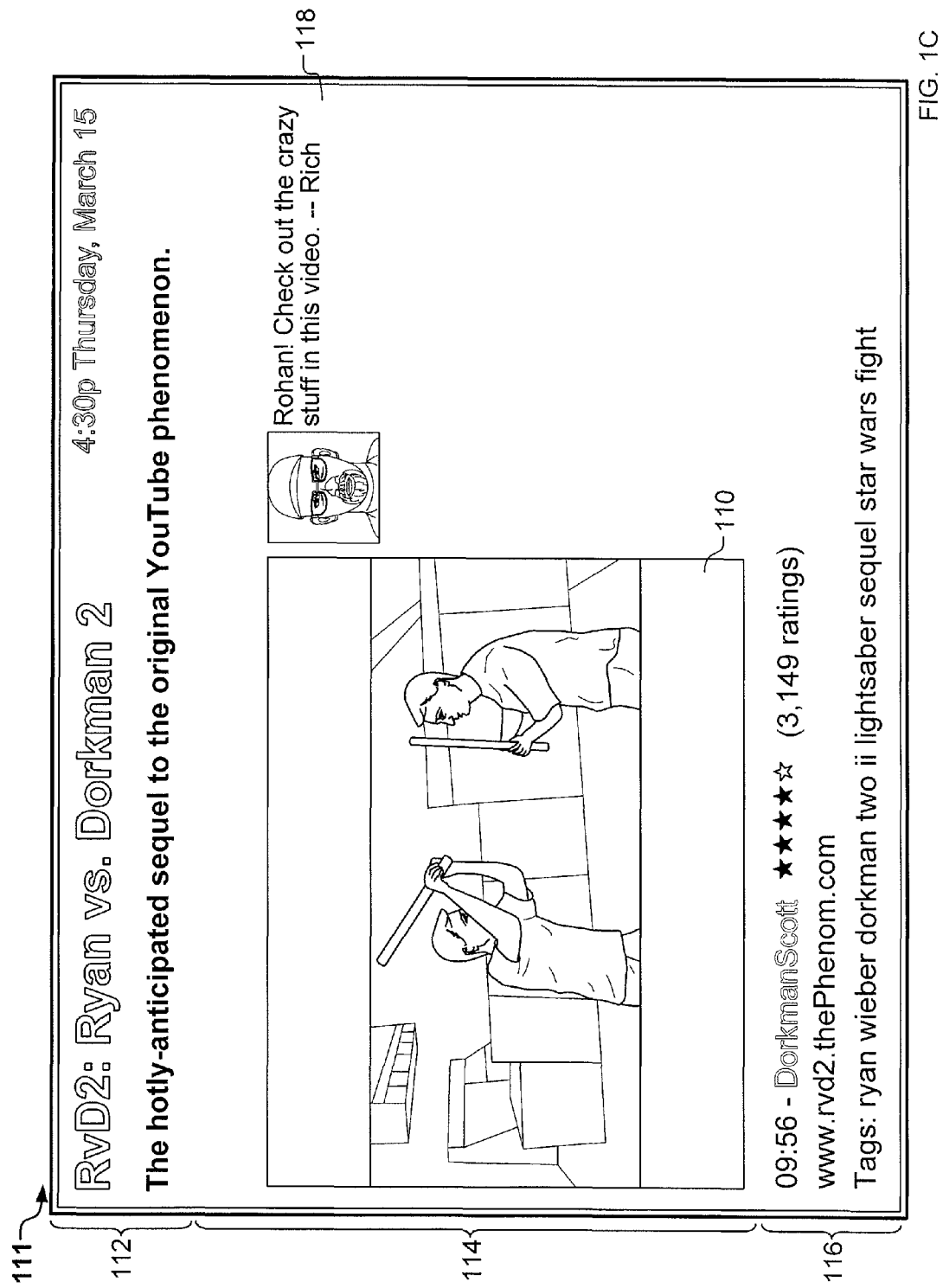
FIG. 1C is a screen shot of an example of a bumper showing program details.

FIG. 1C is a screen shot of an example of a bumper 111 showing program details. The bumper 111 can be reviewed by a user to see program detail, and can also be shown for a short period of time immediately before the corresponding program begins to play (e.g., when programs, such as adjacent programs on a single shelf from FIG. 1B, are being played automatically in succession). The bumper gives the viewer a chance to pause or jump from bumper to bumper in a linear fashion. Hitting the back button while on a bumper zooms the viewer back out to the shelf overview.

Bumpers, whether of program information or advertisements or other information, may also be shown simultaneously with a program, such as in the form of a "bug". A bug is a visible item that takes up less than a substantial portion of the display, and may provide a wide variety of information to a viewer. The big, in certain circumstances, may be caused to generate at various times during the playing of a program so as to act like an in-line commercial, and can be particularly generated as part of a pop up programmable program module of the forms discussed below.

The bumper 111 includes a title area 112 that shows the program title along with a short description of the program. An image area 114 shows a still image from the program, though a bumper 111 for a program like an audio program may simply show a logo or an album cover. Detail area 116 shows particular relevant details about a program, such as the program length and a composite rating level the program has received from other users, a URL for the program or a web site associated with the program, and tags that have been attached to the program. When the bumper is displayed as part of a queue of programs being displayed in sequence, it may be displayed for a pre-determined period and then rolled up so that the corresponding program may be played.

A comment area 118 shows comments on the program from other users such as friends of the first user. The comments may be accompanied automatically by images of the commenting user, in a familiar manner, to permit faster navigation of the comments (e.g., so that a user can more quickly locate comments from someone they respect). Controls may also be provided, such as for the first user to leave comments, or for the first user to complete a message to one of their friends, such as a note playfully castigating a friend for recommending a program that the first user thought was horrible.

While interacting with the display of FIG. 1B, a user, much like with various digital video recorders (DVRs), can "trick play" the content: they can pause, rewind, fast-forward, or skip to the next item or program on the shelf. If they do nothing, once a video starts playing, the system will play the next item on the shelf. In between each show, or as a briefly generated overlay bug, an automatically generated "bumper" briefly describes the next show (including who recommended it, annotations, etc.). A video buffer showing a commercial may also be displayed between programs.

In this example, the highlighted selection remains in the center and the content animates underneath of it (like a magnifying lens) for a selected program. Each successive selection of "OK" or "select" on the remote selects the program, brings up more details, and then begins playing the program. This causes a smooth transition from the spatial metaphor of the shelf to the temporal model of a channel. Unlike pick-and-play models in current DVRs, when this content is done, it then proceeds to the next piece of content on the shelf. Bumpers between the video allow a glimpse of the spatial model if the user wants to smoothly transition back to the shelves, and also can show advertisements or other automatically selected content between programs that are on the shelf.

The model of using a bookshelf to represent rich media is familiar (Card, S. et al., supra and Kukuchi, H., "User Interface for a Digital Library to Support Construction of a "Virtual Personal Library." 1996 Int'l Conf. on Multimedia Computing and Systems (ICMCS'96) (1996)). More recently, APPLE ITUNES on the PC and APPLE TV on television have provided navigation metaphors.

There are several advantages to using a bookshelf metaphor. It allows a user to place various, heterogeneous objects on it (music, video, etc.), it is a familiar mimetic, and it has a close correlation or mapping to play lists and ranked search. Order is implicit from left to right in the design and hitting play starts at the given item and continues to the right, looping when the end has been reached. In addition, looping may occur on the same shelf (e.g., repeat) or from one shelf to the next. Bookshelves can also represent other groupings, for example a persistent search query such as "surfing," and gather all available surfing videos each day.

Bookshelves can be stacked and stacks can be hierarchical. This allows for scaling to large numbers of items. Visually, the system can pre-bias the viewer so that even at small sizes they will still recognize items. Shelves can also be sorted and filtered (e.g. by time, person, ranking). And recommendations/related videos can be highlighted on the shelf (or another shelf). The ability to define shelves explicitly and implicitly (search, recommendation) and then sort them is a simple yet powerful tool. Shelves also allow people to create and share at a level above the individual content. For example, a user can "subscribe" to the Jon Stewart shelf and see what videos he recommends (presumably high-intelligence comedy work).

While watching or listening to a program, if the user decides to share the content, pressing a button on their remote control can bring up a list of friends 140, as shown in FIG. 1F, and the user can share the current content easily with them. The list of friends 140 may be obtained, for example, from a list stored on the user's local client device, but synchronized with a central server. The list 140 may be specific to the sharing application, or may be a more general list of relationships that can be accessed from a social networking system, through which the user manages many other friend-of-friend activities. The playing program may be paused automatically until the sharing actions are complete.

In the example display of FIG. 1F, a display for sharing content with friends is shown, where the list of friends is shown simply as a vertical list of names and corresponding images of the friends, laid over the main television display. Such a display may be generated at any point where a user indicates an intent to share content that they are reviewing. The currently selected friend here is Betty McDonald 148, and pressing by the user of up and down buttons on their remote will cause the list to scroll so that the selection bar appears over others in the list, such as Sara Silverstone 146. Other similar UI mechanisms may be employed to permit easy selection of friends or groups with whom the user would like to share content.

When a sharing selection is made in this example, the user may be asked to provide a comment on the program. Alternatively, if the user does not want to type using a remote control, their account may indicate a need to enter a comment, and they may be asked to enter the comment the next time they log into the system on a computer. The sharing may thus be held in wait until the person provides such comments from their computer. The comments may also be provided via a different mobile device that is identified in the user's account as being associated with the user, such as a smartphone. Thus, for example, when the user makes a selection to share with a friend using their remote control (or using IR functionality on their smartphone as a form of universal remote control), a message may be sent to their smartphone, such as a text message soliciting a comment on the program. The user may then respond to the text message by providing a comment, and the returned text message from the smartphone may be joined with the recommendation received via the user's television device, and may be provided to the friends. In this manner, the user may take advantage of the relative strengths of the general devices that they already own—i.e., television user interface navigation with a remote control, communication about television programming with a set-top box or similar mechanism, and entering alphanumeric information with a computer or wireless communication device.

Thus, using the system described here, a user may identify programs that look interesting as they surf the web, and may send such programs to their home television. When they get home, they can watch the programs, and if the programs are good, the users may easily distributed the programs to their friends along with comments. In a similar manner, they can watch or listen to programs distributed by their friends, and forward the programs on to others of their friends if they enjoy the programs. They may also schedule the programs into blocks of programming, or may watch programming blocks arranged by their friends or by perceived authorities in organizing enjoyable programming. As such, the disclosed systems and techniques permit simple social television programming (SSTP).

Since playing is a level of zoom, this model simplifies the transition from organizational overview (shelves) to actually playing of the content. This model of playing is a hybrid of the temporal channel model of traditional television and the "pick-and-play" model of most PVRs. Allowing automatic playing means that the shows can run in the back-ground while your main attention is elsewhere, but you can always skip back or find stuff on the shelf, relieving the anxiety about missing something. During playing, hitting the dedicated buttons or pause allow a viewer to easily recommend the content to their friends without the intervention of a desktop computer.

Figure 1D:
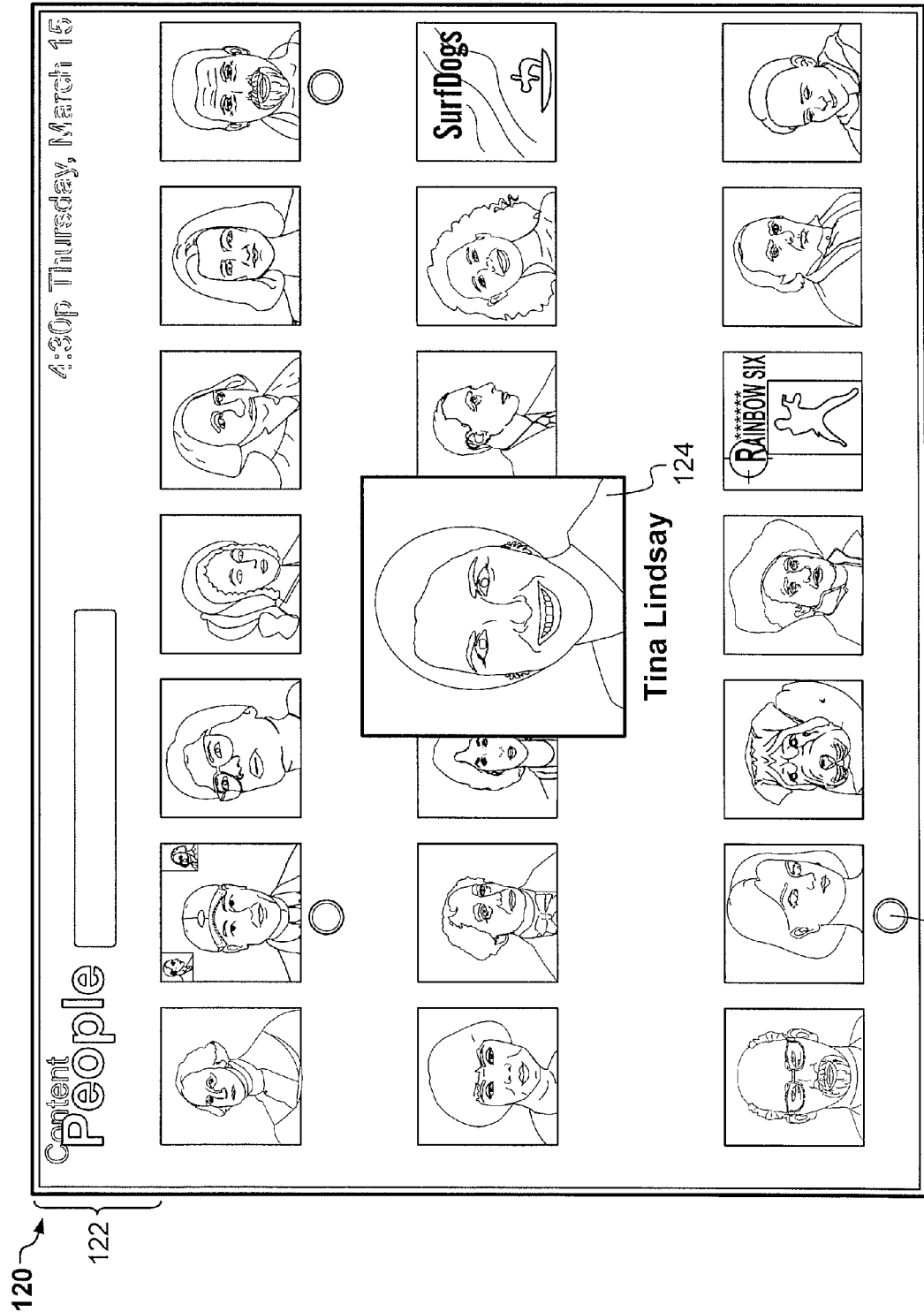
FIG. 1D is a screen shot of a friends gallery showing images associated with a plurality of friends.

As shown in FIG. 1D, a similar shelf model can be used for accessing friends. People can be sorted by frequency of contact (sharing or messaging) or alphabetically, among other things. The details about a person include the list of video that they have shared with the user and that the user has shared with them. Since they see the same thing, this can be a useful place to have media-mediated conversations, see if they are online, etc.

In FIG. 1D, a friends display 120 includes a search area 122, where a user may enter terms to search for a particular friend that is in their network. A particular friend 124, here Tina Lindsey, has been navigated to by the user, with directional keys on a remote control, and is shown here at a higher zoom level. The higher zoom may occur automatically wherever the cursor is located.

Figure 1E:
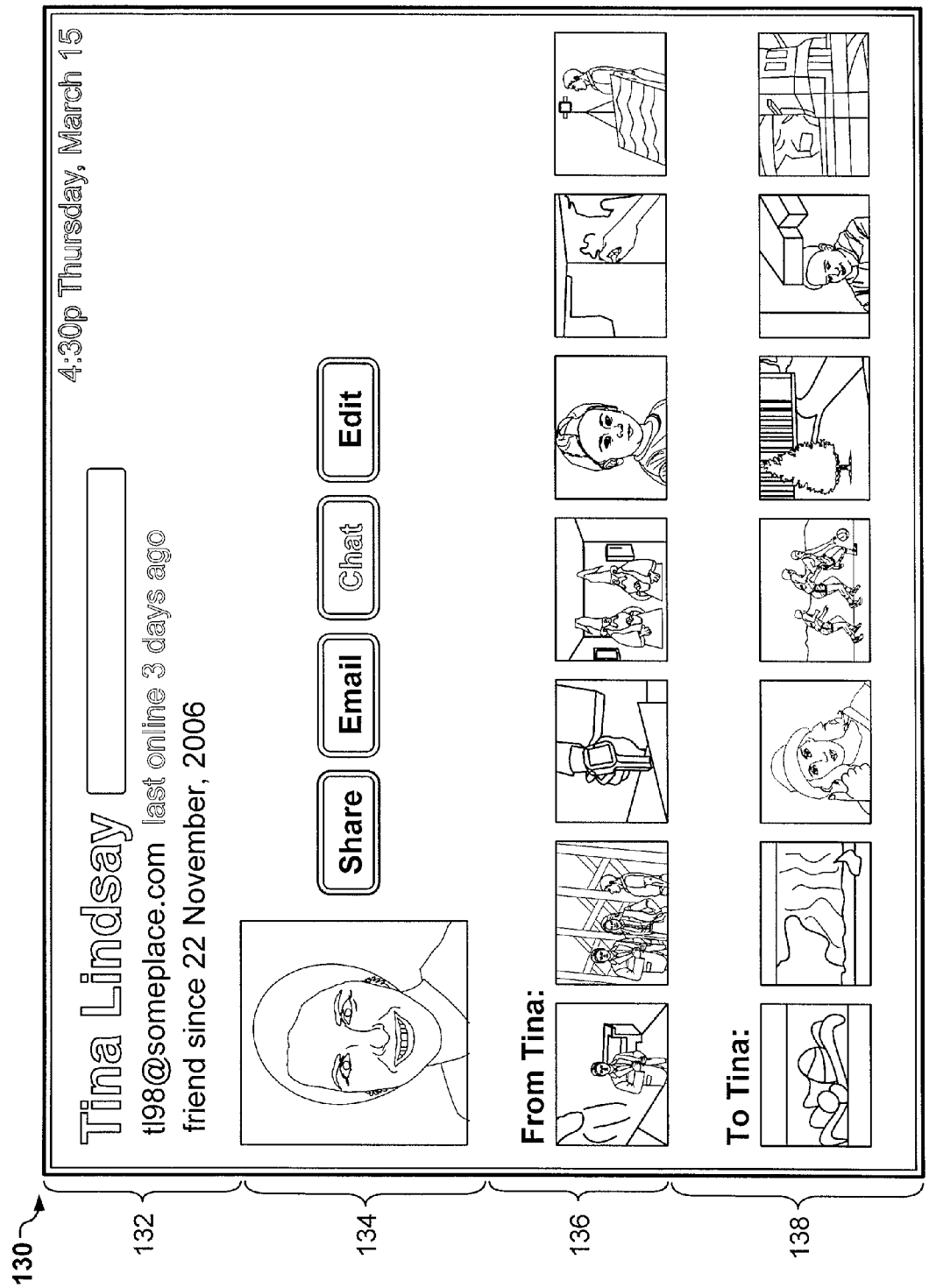
FIG. 1E is a screen shot of a details page for a selected friend.

If the user makes a selection on friend 124, then the additional detail mentioned above may be displayed in a pop-up box, as shown in more detail in FIG. 1E. As shown in FIG. 1E, a display 130 shows a meta data area 132 that shows a search box (for searching across the user's content), an e-mail address of the friend 124, and other data about the friend. A social area 134 contains selectable controls to permit communication with the friend 124 by various simple mechanisms such as chat or e-mail. An incoming area 136 shows content that the friend 124 has shared with the instant user, while an outgoing area 138 shows content the instant user has shared with the friend 124. These area may permit the instant user to determine the sorts of programming that the friend likes, and to thereby match his or her recommendations to the friend to such other programming.

Referring again to FIG. 1D, certain users may be highlighted on the display, such as by a lighted dot 126 or other visual mechanism (e.g., a color border around their image or a pulsing of their image). Such mechanisms may indicate, for example, that that friend is currently on line so that chat communication may occur, or that the friend is a "power user" from whom the instant user has received many very good recommendations. Also, friends who are on line simultaneously may decide to watch a program simultaneously, so that, for example, they can comment back and forth on the program, either via chat or audibly (e.g., using microphones and headsets).

User Flow Example

An example implementation includes a PC-client application dedicated to making link sharing among friends simple and light weight (though similar functionality can be achieved using a set-top box, or may be integrated directly into a television display, particularly if the display supports a native web browser). The PC-client also supports more complicated tasks such as viewing and organizing the content, but not at the cost of sharing fluidity. The system has a web repository to store, manage, and access the links and a TV-client system, in this example. The three-system model supports background downloading so that long-playing, high quality content is available in the entertainment domain where a user may watch several shows. The user gathers recommendations (and the user's friends may also do the same) throughout the day, and the system can automatically fetch and prepare them for viewing at home, including by transmitting the content at a period of lower network load.

Figure 2A:
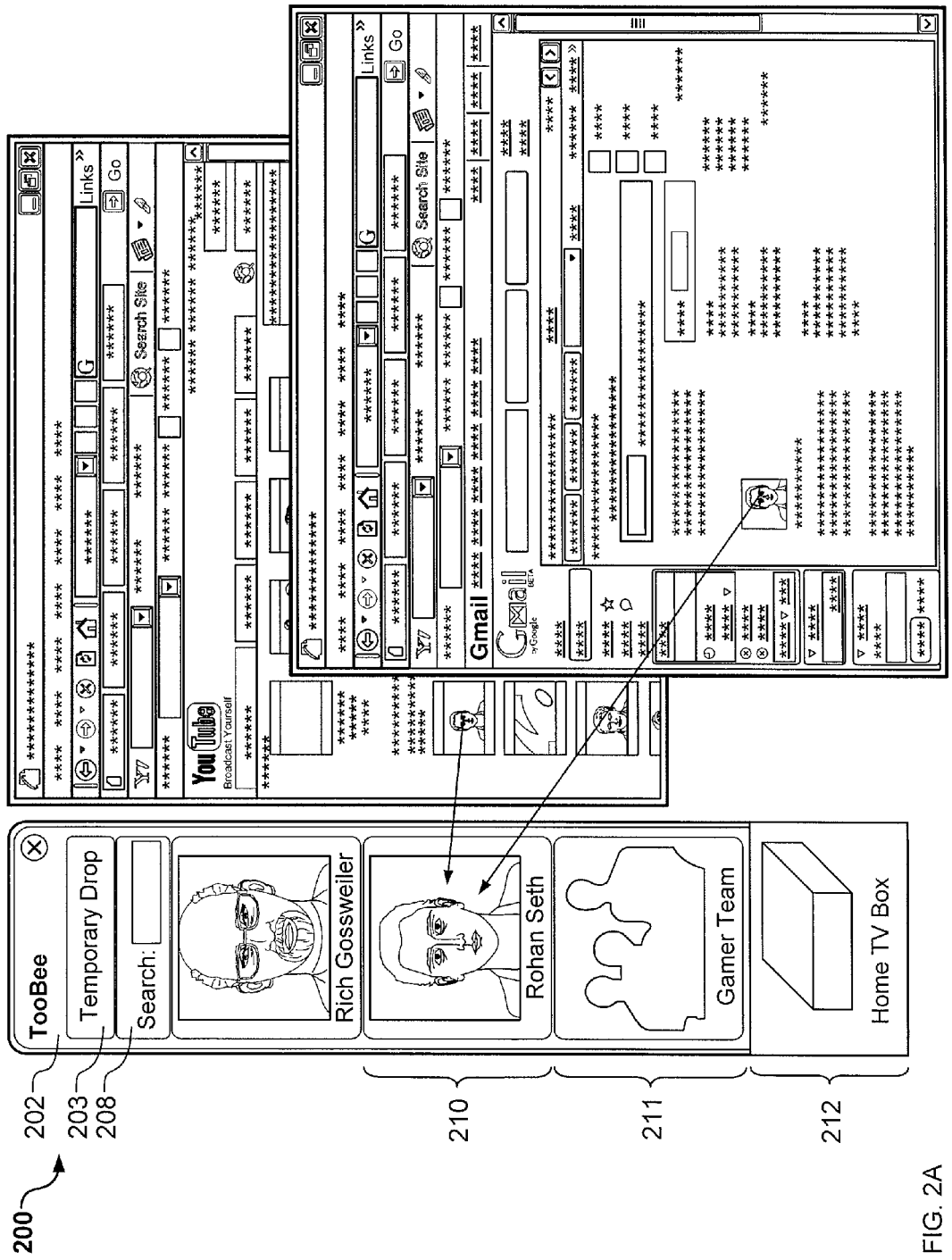
FIG. 2A shows a graphical flow diagram 200 of the gather of program links in a social media sharing application.

FIG. 2A shows a graphical flow diagram 200 of the gathering of program links in a social media sharing application. This illustrative example of the use of a media sharing system may show how a user can interact with his computer to share media program files with friends, groups, and/or devices. The figure shows two web pages 204, 206, and a gathering application 202 that may be displayed as a floating tool over a user's computer desktop, or may be part of a browser toolbar (not shown). The gathering application 202 acts like a bucket for collecting URL links or other such indicators associated with audio-visual programs, such as video files, audio files, podcasts, digital image slide shows, and the like. Where the user drags a link to the gathering application 202 and the link is accessible to the other users, that link may simply be made available to the other users. Where the first user drags a file to the gathering application 202 and the file is not otherwise available (e.g., it is a video of the user's baby stored on the user's local drive), the file may be copied to a central location where it can be accessed by the other users, and then a link to the file may be provided to the other users (and the file automatically downloaded to the other users' devices in certain implementations). The file may be deleted after the last user has reviewed it.

The gathering application 202 includes a number of graphical receiving sections that represent persons, groups, or things to which content may be deposited. For example, user 208 may be a friend of the person who is running the application, and dragging of content to their area on the gathering application 202 may cause the content to be made available to that person conveniently, as described in more detail above and below (e.g., FIG. 1B).

In addition to sharing content with other users, content may be shared with a device 212, which may be a particular audio-visual device, such as a set-top box or other television peripheral. The user of the gathering application 202 may use such an interface to have content deposited on his device at home, or onto his mobile smartphone. The user of the gathering application 202 may instead identify himself as a user 210 and may drag content to himself in appropriate circumstances.

There can be a difference in the action of dragging content to a device 212 versus dragging it to a user 210, however. As described below, users may simply be presented with content as an option when they get home and turn on their television, without the content having been previously downloaded to their device. That is because, if they have a large number of friends, the collected amount of media they might receive could be substantial, and could consume unnecessary network bandwidth. Thus, in such a situation, when sharing with a friend occurs, only links to the content may be created in a profile associated with the user who is having the content shown to them, and that profile may be accessed from a central system when the user sits down in front of their television.

In contrast, actions of sharing with a device may cause the actual content to be downloaded to the device in the background automatically—such as while the user is still at work. Such additional bandwidth usage may be tolerable because the user, having direct access to the device, can be presumed to be the device owner or someone in a relatively small group that has been given direct access to the device. Also, it can be assumed that the recipient of the content really wants to see the content, and thus would have burdened the network with its download when they returned home, in any event. The actual downloading may be immediate or nearly immediate, or may be scheduled. For example, a user may establish an account whereby they indicate that they do not watch television at home until after 6 p.m. on a weekday. If the user drags content to their device while they are on their lunch break at work, the download of the content to their home television may be delayed until late afternoon because networks may be abnormally busy over the lunch hour, and the downloading of video at that time may place an unnecessary strain on the network. The user may also be given the option, at the time of dragging material to the gathering application 202, to make the download immediate or scheduled, e.g., such as having two zones on the image of the device or by having a right-click-and-drag operation by which a contextual menu permits a choice of "immediate" or "scheduled."

Group identifier 211 provides sharing that is similar to that for the user 210, but across a defined group of users. For example, a user may establish a program distribution list, much like establishing an email distribution list, of a group of friends with whom they like to share audio-visual content. A single dragging action may then send notifications to the accounts of all those users. A group may also include other groups. A person or group can be in multiple groups, so groups are not strictly hierarchical (and cycle detection may occur to resolve the final set of people with whom to share). From a developer API's standpoint, a group can have a unique ID and can be identified based on the creator of the group (a person ID) and the name of the group (group names are unique within a person who creates them). In this manner, developers may provide extensions to the disclosed system by which to provide for even further social interactions between users and their media.

Figure 2B:
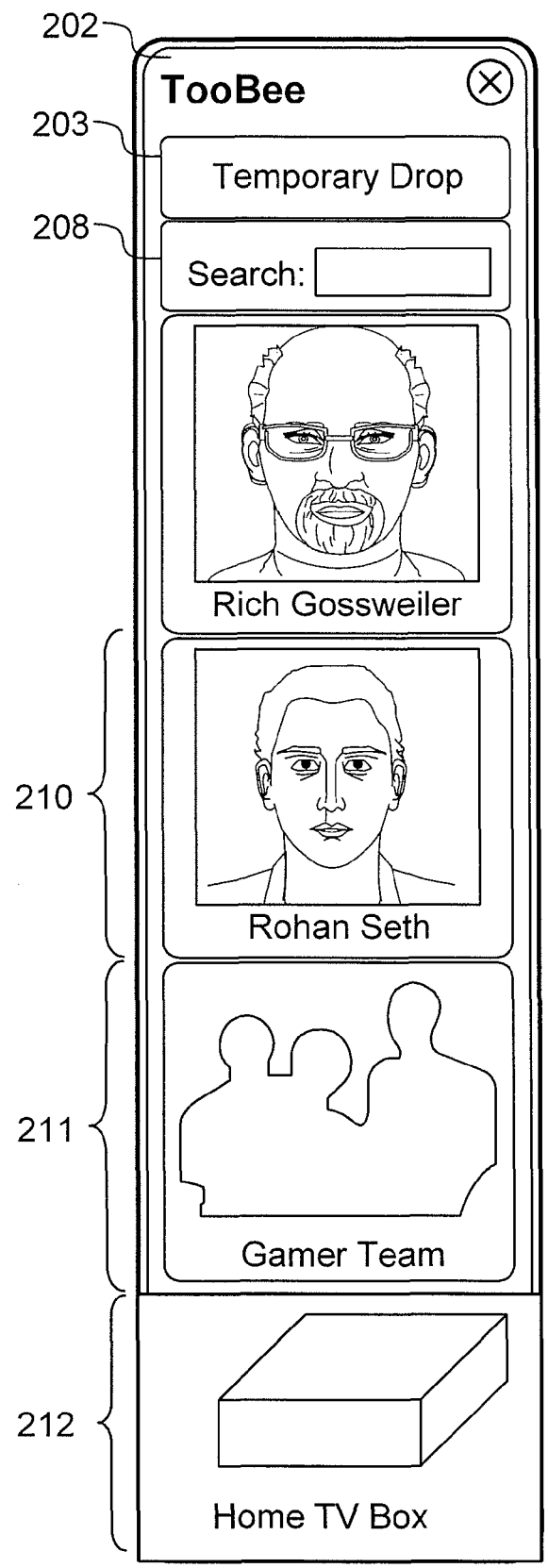
FIG. 2B shows a video gathering application that displays friends to which a user may drag representations of media files for association of the files with the selected friends.
Figure 2C:
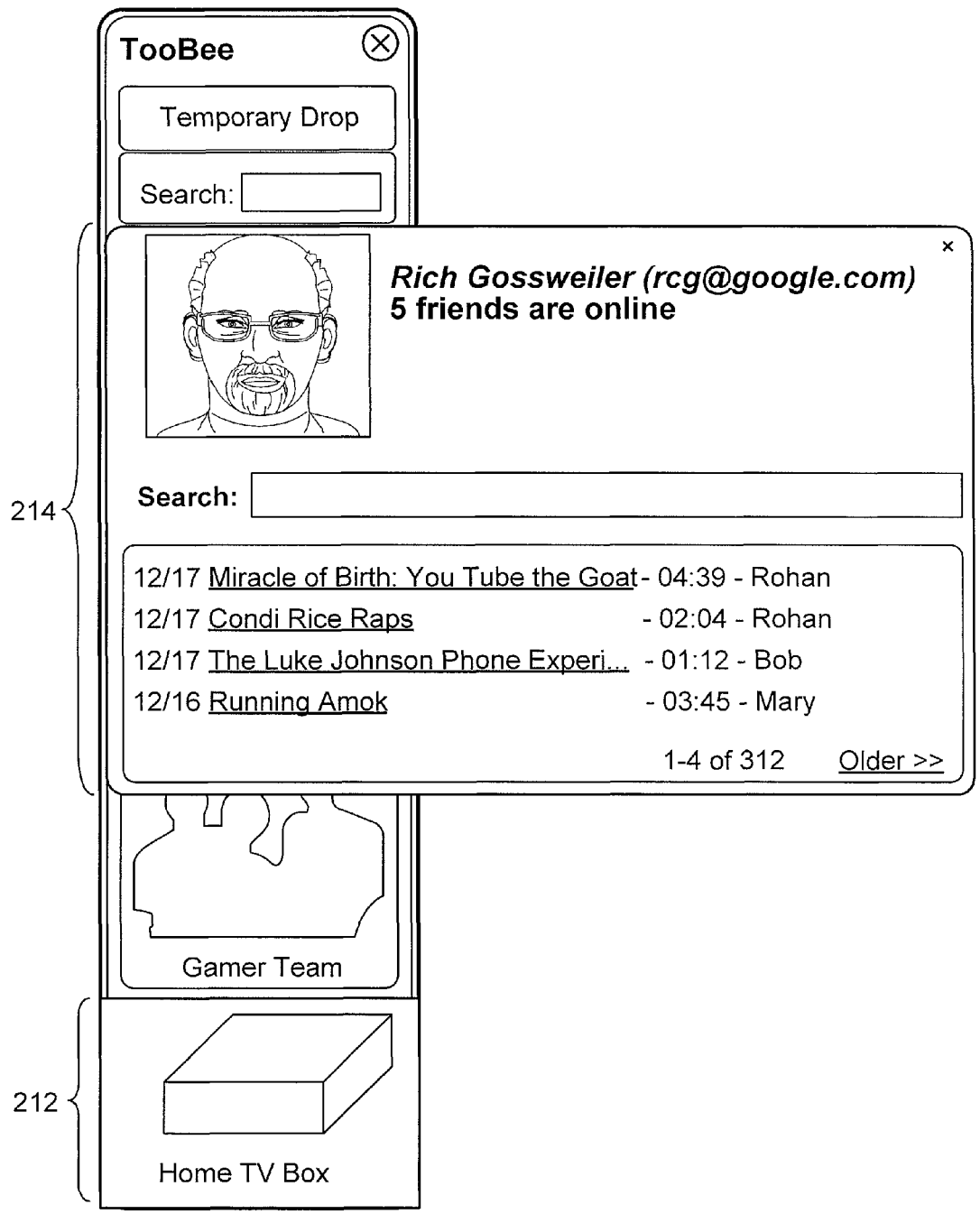
FIG. 2C shows detail information for a friend in the application of FIG. 2B.

The group may also be an "opt in" group, whereby the first user sets up the container of a group and other people can join the group as they like. In this manner, a user my make themselves an authority in a particular area and may, in effect, become a program manager. Other users who like the style of the first user may then subscribe to the first user's "channel." As one example, the first user may be a DJ who is very good at finding breaking music acts, and may thus put together a playlist by dragging links (e.g., off of band pages on a social networking site) to the gathering application 202 (and may subsequently use an application to re-order the content) and make it available to the public. When other users who have subscribed to the first user's "channel" get home, they can turn on their home entertainment system, and have the programmed playlist played while they prepare dinner. The first user may also apply post-selection alterations such as adding voice commentary between programs, such as songs. Thus, for example, a classical music expert could provide brief comments before each song that they play on their channel. Such user-programmed media systems are also described in co-pending U.S. patent application Ser. No. 11/742,495, filed Apr. 30, 2007, which is incorporated herein by reference in its entirety, and particularly with respect to its discussion of custom media channels that can be formed by users of a system.

Where a user wishes to drag content to the sharing application 202 but the friend or group they would like to share with does not appear there, they can drop it into a "temporary" drop 207, shown in FIGS. 2B and 2C. The temporary drop holds an indicator for the content, such as a URL, but does not send it to any one else's account or to a device. Rather, the temporary drop 207 simply holds the content indicator until the user is able to search for, locate, and add the friend or group with which they originally intended to share the content.

In one particular example of the operation of such a system, during the day, a user may receive an email from their friend Bob with a YOUTUBE link in it (not shown). Instead of resolving the link and watching it now, the user can simply drag it to the gathering application 202. The user can also drag the link to other users 210 in the list to quickly share with them or with groups. This allows the first user to extract, very easily, recommended links from external systems and import them into the sharing system 200.

This can also create a chain or graph of people through which the content is shared or flows. Such information about the graph through which the flow occurs, and the timing of the flows can be used to conduct flow and graph analysis. For example, it can be determined that something suddenly gets shared a lot, or that everything shared from Rich to Bob, was then shared by Bob to Fred, making Fred a "hidden" friend of Rich. Similar sharing patterns (temporal and structural similarities) can be used to recommend content from other people without revealing those people to each other. Also, "hot" content that is being shared rapidly can be identified, even within small groups of people (long tail). And "hot" people whose sharing is indicative of a larger demographic can be identified (e.g., everything Bob shares, geeks love). Such a graph can be referenced as a POG or People-Object-Graph.

If a user clicks on his or her identifier in the gathering application 202, he or she can be shown a list of programs that are currently queued for them (FIG. 2C). The programs may be shown in a list in the order they are currently queued to be shown, along with a title of each program, a length in time of the program, and the person who shared the program. In addition, though not shown, an icon or frame around the image (e.g. a film strip around the picture of the video a picture frame around an image, a curl of paper around a web page) may be provided to indicate the type of each program, such as short video (e.g., clip), long video (e.g., movie or television program), podcast, audio file, etc., and whether the content is free or requires payment. In addition, a search box is provided so that the user may find particular programs if the list of queued programs is very long.

The display of FIG. 2C also shows general social features, such as an indicator of how many friends of the user are currently on line. Chat features (not shown) may also be provided, and the gathering application 202 may be integrated with a chat toolbar, such as by augmenting a traditional chat toolbar with the ability to drag content to friends in the toolbar. The user may also direct-drag items that others have shared with them, out of their list, and onto others of their friends (though the system may prevent dragging to the friend who shared it in the first place).

Referring again to the example associated with FIG. 2A, Bob may have sent the first user a recommended link and the first user may then immediately share it with others in his or her friend list that are not in Bob's list. No other applications or tools would be needed, in this example, to share this link, such as an e-mail application or other such application.

When the user goes home, their set top box can have been diligently monitoring their link repository (stored, e.g., on a central server that communicates with the gathering application 202) and pre-fetching the content, or the repository may have pushed the content out. Since it happens as a background process, the user can download longer content at a higher quality and have it ready for playing without hitching. (The content can be encrypted to protect rights and the encryption itself can be updated or changed over time.)

Figure 6:
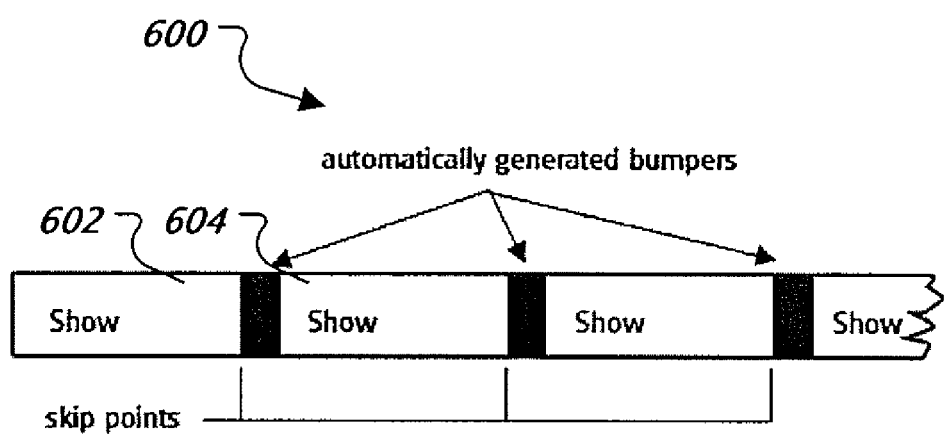
FIG. 6 graphically displays organization of media programs or shows, and intervening bumpers.

As described further below, "bumpers" may be placed between media programs, such as commercials and other similar promotional items, as shown by schedule 600, program 602, and bumper 604 in FIG. 6. The commercials may be targeted and matched to the programs in familiar fashion such as by using tags associated with audio or video files as key words for ad selection. Also, where a first user produces a program line up for a plurality of other users, the first user may be provided, by a system managing the sharing, with a share of the ad revenue. Alternatively, the user may be given the opportunity to insert one or more of his or her own bumpers from time to time, so that he or she may sign up his or her own sponsors and obtain remuneration for his or her programming efforts.

Figure 3A:
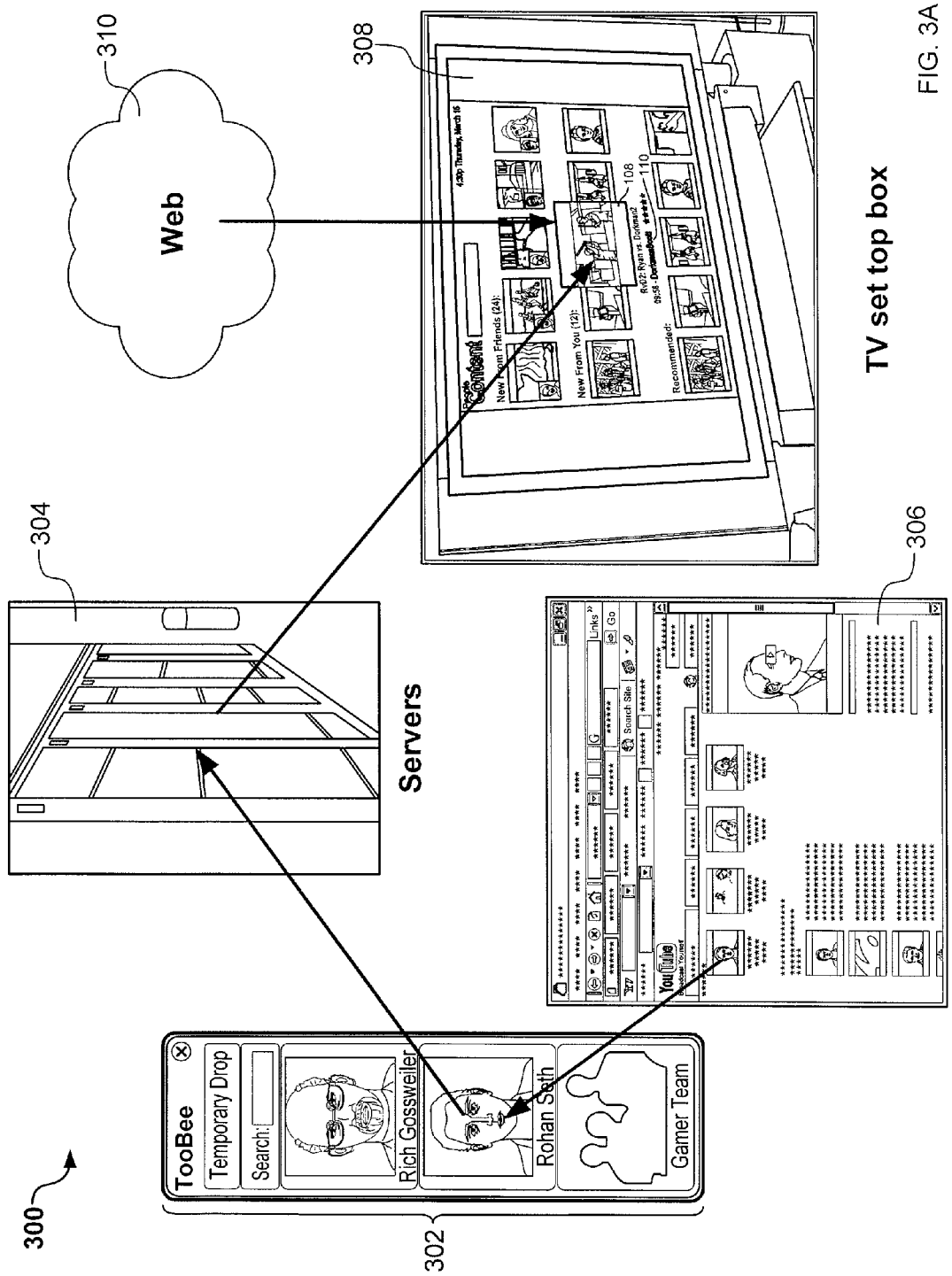
FIG. 3A is a schematic diagram showing the recommendation on a personal computer of a video file, and the subsequent delivery of the file to a television of the recommender or of a friend of the recommender.

FIG. 3A is a schematic diagram showing the recommendation on a personal computer of a video file, and the subsequent delivery of the file to a television of the recommender or of a friend of the recommender. There are three parts to the exemplary system 300: (1) a computer client 306 working with a gathering application 302 that helps a user gather the content on their personal computer with minimal effort; (2) a central server 304 (which may include many servers) having a web repository that stores and organizes friends, shared links, and other similar information, and; (3) a television client 308 that presents a navigation model, plays the content, and allows sharing from a television.

The Computer Client

Currently there are at least three common ways that the user discovers new video content when they are away from the television: they see it at a website such as YOUTUBE, they see embedded video content on third-party sites, or they receive a link via email. By providing one tool where a user can quickly gather links from various disparate locations, the system 300 simplifies this process. A client tool, such as the gathering application 302, can give users the ability to share within the system 300 itself. For example, if someone has e-mailed a user links (outside the system) or sent a user links from a gathering application on another computer, the user can see the links and share them with others in the system 300 social network simply. Such a system meets the social need of sharing as easy as fulfilling your personal need of collecting content.

In its simplest form, the gathering application 302 consists of a short list of a user's friends. People are represented as a unique id, their email, their name, and an icon. The system 300 creates a friend list and allows a user to present them alphabetically or in frequency of access. The first element in the list is a user's icon, making it easy to quickly gather content for later viewing and sharing. Adding a friend sends the person an e-mail and if they accept, then the friendship is considered mutual. Dragging a video link from the browser and dropping it on a friend sends the link to the internet repository indicating when the link was shared, by whom, and to whom. Clicking on the face of the selected user brings up further details about the user. A user can also search over this list, for example, to locate all video with "surfing" in the title. This is a familiar format that can scale and supports common filtering, sorting, and annotating.

Central Server and Internet Repository

In the initial prototype system, the internet component in the central server 304 is basically used as a simple data storage that can be accessed through standard internet protocols. The repository uses a simple relational database to hold the list of people, friends, groups, group members, and shared content. Several advantages arise from using this model. First is that it is a familiar and well implemented model. Second, the system 300 can use http to get and send data, and access it from a variety of places with a variety of devices. Finally, the repository allows the system 300 to do sophisticated storage, data modeling, and complex analyses (e.g. clustering animations or caching prominent content in multiple data centers/head ends), when the need arises.

The repository may store only simple content such as links, and can also be supplemented with a binary storage system that actually can store media files. The link storage may simply reference files that are publicly accessible elsewhere on the internet, while a related binary storage system may hold files that have been uploaded form client devices because they were not available elsewhere. The access to such uploaded files may vary based on the preferences of the user who uploaded them—such as by being limited to access only by friends with which the user chose to share the media, up to full public access of the media.

Television Client

The television client 308 can run on off-the-shelf hardware making it easy to obtain, build, experiment with, and rapidly extend. In prototype form, it may use an ordinary laptop, a remote control with drivers, and SVGA cables to ensure it works at standard "TV" resolutions. The television client 308 may obtain content and communicate to obtain and provide recommendations over a network such as the internet 310.

The stack for television client 308 can include: a set-top box hardware prototype built from off-the-shelf components; transport through the internet; low level drivers for remotes, video & file systems; middle level file and "window" management that handles full screen video, overlays, and events; high level applications such as background content fetchers, players, and watchdogs; a higher-level navigation model based on zoomable shelves, trick-play, persistent searches, and television widgets.

Figure 5:
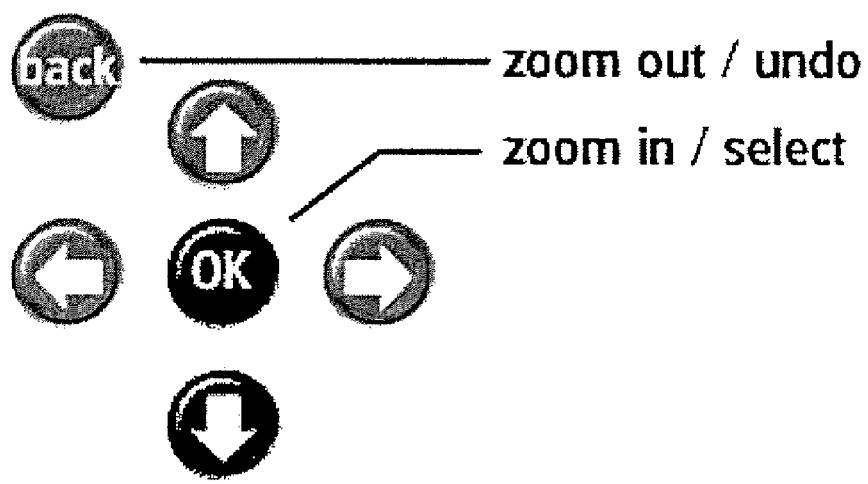
FIG. 5 shows an example of four-direction navigation controls for a television remote control.

The client 308 can use an off-the-shelf remote control used to control PC-based PVRs. FIG. 5 shows how a few buttons can be used to navigate in three dimensions. Since zooming all the way in actually plays the video, the client 308 is able to overload the "select" button with "zoom in" and "back/undo" with "zoom out."

Figure 3B:
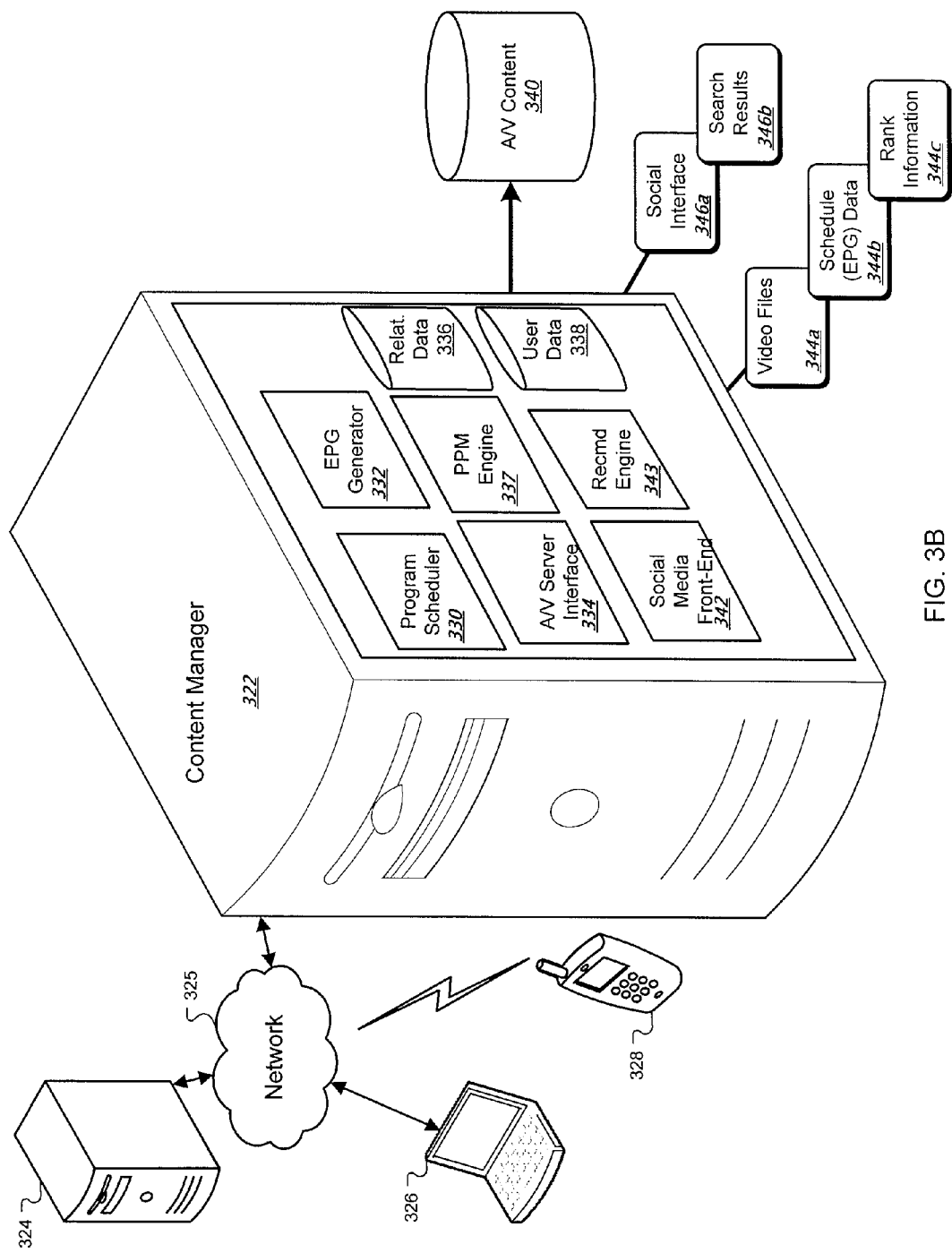
FIG. 3B is a schematic diagram of a system for sharing audio-visual program content.

Referring now to FIG. 3B, there is shown a schematic diagram of a system 320 for sharing audio-visual program content. This figure focuses more on the structure of an example content manager server 322, which may coordinate the sharing of audio-visual content among multiple users. The system centers around the content manager server 322, which connects through a network 325 such as the internet, to a desktop computer 324, a flat panel television 326, and a mobile device 328 such as a smartphone. The server 322 may host s repository of shared media such as the repository discussed in relation to FIG. 3A and may be made up of one or more different servers, but is shown here as a single server 322 for clarity.

The desktop computer 324 represents a computing device through which a user may surf the web and provide media program recommendations for their own television or for other users. The television 326 represents a device on which a user may see recommendations from themselves or from others, may review audio-visual content, and may make simple actions to forward recommendations to other users, in manners like those discussed above. The mobile device may provide both sorts of interaction—for example, a user may surf the web or answer emails while commuting on their bus so as to identify links to media programs, and may then watch the programs as soon as they get home. Likewise, they may watch programs suggested by others on their mobile device, depending on their particular mood.

Content manager server 322 is shown as including a number of components needed to organize social sharing of media programs. A social media front-end 342 manages user interactions with the content manager server 322. For example, the social media front-end 342 may provide code to client devices for generating an interface like the gathering interface 202 in FIG. 2 (which may be executed on the server 322 or on the client devices). The social media front-end 342 may also provide data to clients for populating such an interface. In addition, the social media front-end 342 may receive input from clients, such as indications that a particular piece of media is to be shared or recommended to a number of friends of a user, or groups associated with a user.

The social media front-end 342 may supply such input information to a user data database 338. The database 338 may, for example, include profile information about particular users within a system, along with information about programs that they have recommended and that have been recommended to them. A related database—the relationship data database 336—may include data reflecting links between users in the system 320. The relationship data database 336, for example, may include data like that is normally provided in a social networking system to show particular acquaintance relationships between users of the system (e.g., friends, and friends of friends). The relationship data database 336 may be used by the social media front-end 342 to provide clients with lists of friends and other acquaintances of a user associated with the clients. The relationship database 336 may also be accessed from an external sub-system such as from a separate social networking system.

An audio-video server interface 334 may be responsible for communicating with client devices that are to exhibit programs for the system 320. For example, the audio-video server interface 334 may, in response to commands from the social media front-end 342 regarding shows recommended by a user, or shows to be loaded on a user's television set-top box, schedule one or more downloads of content to be provided to users. In addition, the audio-video server interface 334 may respond directly to requests from a television, such as when a user of the television selects a program that has been recommended by a friend but has not been previously downloaded to the television, to cause the content to be served to the appropriate client.

The audio-visual content for programs may be fetched from audio-visual content database 340, which is shown here as a single database connected through the server 322. The files in such a database may be referenced by URLs or other such pointers, so that they can be accessed conveniently. Alternatively, the audio-visual content may be stored away from the server 322, such as at separate web sites (e.g., YOUTUBE) where the content resides natively. Also, certain content may be referenced in its native state at its original location while other content may be duplicated for use with the system 322, and stored on the system 322. The decision of which content to reference externally may depend, for instance, on an analysis of the permanence of pages at the web site, where relatively stable web sites will be selected to be externally referenced because they are much less likely to delete a file so that later users would not be able to get to it.

A program scheduler 330 may further be used to integrate recommendations provided by the user himself, by friends of the user, or by automatic recommendations such as by persistent searches, to produce one or more programming schedules. A programming schedule may include a serial ordering of programs to be displayed to a user, and may also in appropriate circumstances include advertisements to be played during bumper segments between programs. The program scheduler 330 may, for instance, sort a number of programs that have previously been identified by a user, so that programs may be displayed in an order most pleasing to the user. In one example, the programs may be ordered from highest rated to lowest rated programs (such as by star ratings assigned by viewers). In another example, the programs may be sorted from most relevant to least relevant, where relevance is determined by comparing concepts associated with the programs to concepts associated with the user. For example, a particular program may include metadata that associates the program with a particular demographic group, such as retired females. Such a program may be elevated in a queue for a user who is a retired female. Alternatively, the programs may be ordered by type, so as to create a consistent flow of programs throughout a viewing session. As one example, serious programs may be grouped together, and comedy programs may also be grouped together, with a separation between the two types of programming. Other similar mechanisms for ordering programs in a schedule may also be used. Users may choose to opt in before providing any such demographic data.

Information from the program scheduler 330 may be provided to an EPG generator 332. The EPG generator 332 may use such programming schedules to produce an electronic program guide, that includes programming during a certain period for a number of channels associated with a television. In this example, a schedule generated by the program scheduler 330 may be provided to the EPG generator 332 for incorporation as one of the channels in an electronic program guide to be provided to a user. Such channels may include broadcast channels like those in a traditional EPG, and may also include custom channels arranged by or for a user or users. For example, if a user trusts the tastes of another user, they can simply let their television run all evening on a channel created by that other user—with advertising revenue shared by the programmer, the creators of the programs that are shown, and the operator of the system 320.

Portable program module engine 337 may be provided in content manager server 322 to generate program modules such as gadgets or widgets, to be displayed on a user's television. The portable program module engine 337 may serve code for generating displays over the video on a television, such as by using a borderless Web browser defining certain IFramed areas for the display of the content, where the displays may be generated so as to appear to be overlaid on the video. In this manner, the portable program module engine 337 may operate similar to systems such as the iGoogle homepage that permits users to select gadgets that they would like to have displayed to them on a standard page.

Figure 7:
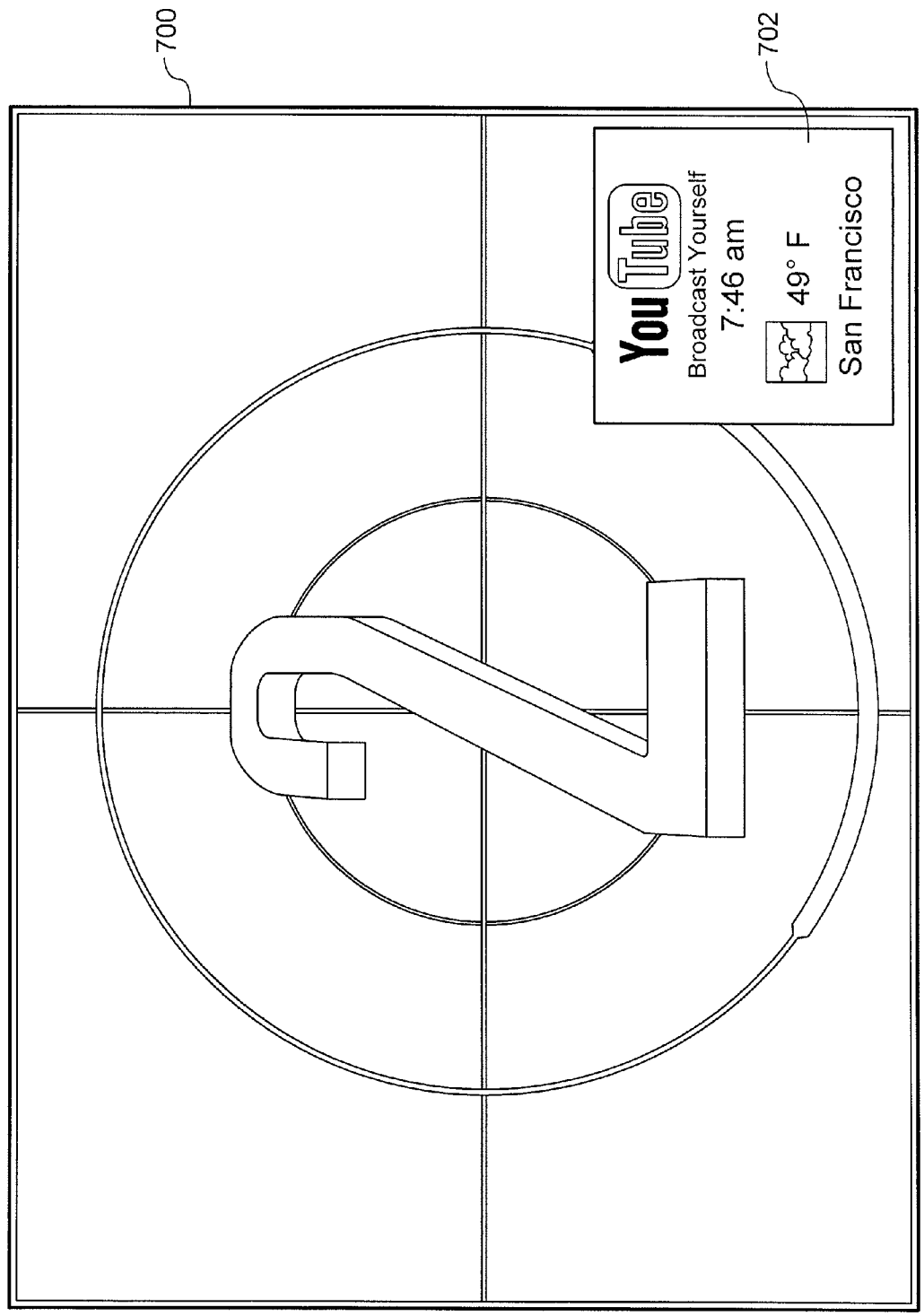
FIG. 7 is a screen shot showing a TV widget superimpose on a video display.

One such gadget is shown in FIG. 7 overlaid on a playing video 700 in a semi-transparent manner. A particular module 702 includes JavaScript and HTML code for generating a current weather indicator. In this example, when a client device determines that the module is to be loaded and displayed, it may gather the code for the module and provide it to the web browser in an element like an HTML IFrame, and may run the code inside the IFrame. The code, when run, may obtain information, such as the local temperature currently in San Francisco, in this example. Particular up-to-date content for the module 142 may be obtained by code in the module calling a live source connected to the Internet.

A variety of other portable program modules may also be implemented. For example, a module may be fed information about breaking news and may pop up over a display of a program when important news occurs—providing an effect like that provided by broadcast networks, but over the top of stored, on-demand media content. Other program modules that have not been written to operate with a television-based interface may also be converted, including on the fly, as described more fully below.

Other portable program modules may obtain information from the client device to supply a user with targeted information. For example, a portable program module may obtain information identifying the program that is currently being displayed by the system, and may make recommendations for other similar programs (e.g., "If you like X, you'll love Y."). Such information may also be used to identify other users that are currently watching the same program so that, for example, the users may be entered to a common chat room where they can discuss the program while it runs and afterward. Another portable program module may obtain information about products shown in a program and may search for information about similar products that the user can purchase. For example, a video may be coded with areas on the display where products are shown, and a viewer of the program may move a cursor around the display to highlight a product and have a portable program module pop up and list a number of stores where the product can be purchased. In a similar manner, an identifier for a product, or keywords associated with a program may be obtained by a portable program module that passes the identity of the program to a central server, and the portable program module can then pass such keywords to an actively changing web site such as eBay to obtain information about current, ongoing auctions for the product or similar products, and to thereby provide the user with up-to-date information.

As noted, the portable program module engine 337 may also be programmed to include auxiliary capabilities for reformatting program modules that are not suitable for display on a television. For example, modules with small text and extensive content generally are not suitable for television display because of the distance between a viewer and the television. In addition, many computer displays have a different aspect ratio than a typical television display, which may affect the manner in which a program module looks when displayed to a user. Also, televisions are often of a different resolution than are computer monitors.

To adjust for such problems, and to permit portable program modules to be migrated to television-based displays without the need for extensive re-programming of such modules, the portable program module engine 337 may automatically convert the code for program modules so as to work on television displays. An example process for such conversion is described with respect to FIG. 8A below.

In this example, the televisions widgets use GOOGLE GADGETS, an open architecture that includes, for the most part, HTML and JavaScript. This means that televisions widgets can be derived from modules that work unmodified on tens of thousands of existing websites, including the GOOGLE homepage, desktop products like GOOGLE DESKTOP, VISTA sidebar and Mac OSX Dashboard, and enterprise portal products from companies like IBM. Going the other way, thousands of GOOGLE GADGETS written for these other types of products will work on television sets, where appropriate.

Users can then configure channels to hold not only video content but also program modules, and may define whether they are present all of the time or just on pause (users can also configure them to be present across all channels and may also include alert notification). In FIG. 7, for example, the weather data is being provided by an RSS feed. For example, a programmer of a personalized channel may himself identify products in a program and provide for a portable program module that permits selection and purchase of the items, if a seller of the items is willing to give the programmer a referral credit for viewers who purchase the item. Programmers could also program other sorts of widgets, such as a snow condition reporter to be displayed during a Warren Miller skiing video.

A recommendation engine 343 may serve to receive recommendations from users to other users and to generate automatic recommendations. The combination of powerful search (e.g. fast indexing, handling stemming, crowding, etc.) and good recommendation engines help the user deal with scaling and content discovery. Recommendation engines have been around for many years and a good taxonomy may be found at Montaner, M. et al., "2003: A Taxonomy of Recommender Agents on the Internet," in *Artificial Intelligence Review*, 19, pp. 285-330. Arissono, L. et al., *Personalized Digital Television*, Kluwer Academic Publishers, The Netherlands (ISBN 1-4020-2163-1) presents several articles around recommendations for Electronic Program Guides (EPGs).

The system 320 may generate a number of different outputs that can be used with devices 324-328. For example, a social interface 346a like the sharing application 202 of FIG. 2A may be provided to allow users to share media content with other users.

Figure 3C:
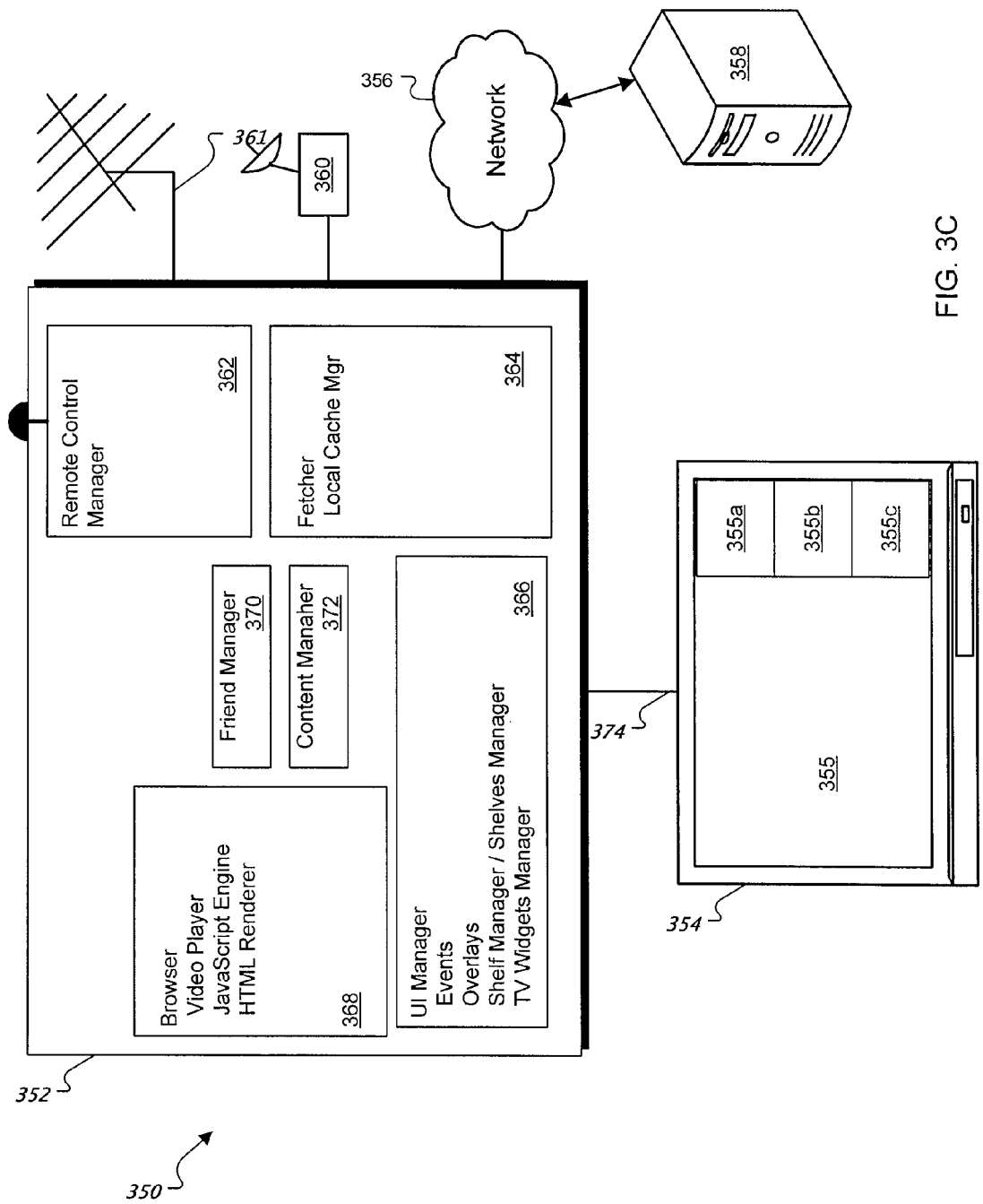
FIG. 3C is a block diagram of a media display management system.

FIG. 3C is a block diagram of a media display management system 350 for managing content delivery to a television device, which may include various forms of video monitors equipped to deliver broadcast programming in various manners, such as over the air, via cable, or satellite programming. System 350 is shown as involving a television 354 and set top box 352, which are shown separately for clarity and because the two have traditionally been provided separately, but can also be integrated with each other.

Set top box 352 accepts a number of inputs. For example, terrestrial over-the-air broadcasts, such as in digital form (at various standard definitions), may be received via antenna 361. Other information may appear from paid broadcaster 360, which may include standard cable television operators or satellite television. Additional media content may be received through network 356 such as the internet, from server 358. Server 358 may represent various forms of servers, including a server for managing user accounts, tracking relationships among user, and performing other administrative functions, such as content manager server 322 in FIG. 3B. Server 358 may also include various media servers delivering audiovisual content, such as in various standard streaming formats and by other approaches.

Fetcher 364 is controlled by other components in set top box 352 to acquire and store, or cache, audiovisual content from the various sources to which set top box 352 is connected. Fetcher 364 may include, for example, media such as a hard disk drive or other storage for holding a sufficient amount of media content so as to permit convenient viewing of the content. Where system 350 is designed to provide content via streaming only, persistent storage in fetcher 364 may be reduced substantially or eliminated.

UI manager 366 may include a number of components for controlling the manner in which graphical objects are displayed on a television monitor. For example, an events manager make keep track of scheduled or unscheduled events with respect to media display on the system 350. Scheduled event may include, for example, scheduled downloads of content such as by causing fetcher 364 to request content, and may also include unscheduled events such as requests received from a user via a remote control (via remote control manager 362, which may take a standard form). An overlays manager may also be provided, which may cause a number of graphical elements to be added to a media display on television 354, such as menus and other objects.

A shelf manager and a shelves manager may also be provided. A shelf manager may control a user's interaction with programs arranged in a particular shelf displayed to the user. For example, the shelf manager may show a number of media files in a linear array, with blanks representing bumper content between each file. The shelf manager may receive commands from a user to move forward or backward between the various files, such as commands entered to direction arrows on a television remote control (which may include universal remotes). A shelves manager may control actions across multiple shelves. For instance, a shelves manager may determine which shelves are shown and the bases on which those shelves are organized. As one example, a separate shelf may be shown for each friend of a user. If the user does not have many content items recommended by friends, the items from all the friends may be merged onto a single shelf, and in some circumstances, an identifier for each fiend, such as a photo of the friend, may be shown with a fixed frame of the media content (see top shelf in FIG. 1B).

In addition, other shelves may be organized from other sources. For example, one shelve may contain the top rated or most viewed programs, while another shelf may contain programs recommended by the user himself or herself. For example, a user may browse and select media files during their commute, on a portable device, or over their lunch hour, on a desktop computer, and indicators for the files may be associated with their account so that the files are queued up for them when they get home from work. The limited capabilities (e.g. relatively low bandwidth and screen resolution) of the mobile device may be acceptable for selecting still images, while higher performance activities such as displaying motion video may be reserved for more capable home equipment. In addition, users may indicate that they are part of a group, such as a club or a group of subscribers, and media recommendations may be made by one or more persons or systems for the group. As one example, a user with interests in aviation may join an aviation group, and may thus have a shelf that shows various spectacular aviation videos. The shelf may be organized by an organization, such as an organization that is given the opportunity to include advertising on the shelf in exchange for their organizational work, or by a person, such as a volunteer (or someone who sells advertising time and makes themselves effectively a program manager) with recognized skill at organizing entertaining programming.

In addition, a search result such as "dog videos" or "dog images" or "dog" can become "persistent" every day (or some time unit), so that new media files about dogs gets added to the shelf. A user can tag items on shelves and "lock" them so that they do not go away. Thus, if a user sees an interesting talk on a computer programming topic, they can save it and build up a collection/shelf. So, a shelf can represent a persistent, ongoing search and a locked down set of results, and facilitate a hybrid of both.

A content manager 372 may accept requires from other modules to store and to deliver content and may cause the content to be served in such situations. In general, the content manager 372 operates to communicate the identity of the user's content to other components in the system 350.

Browser 368 may provide standard browser functionality, and may provide for full screen video display in appropriate circumstance, and may generate graphical overlays for video. The browser may be configured, for example, to generate gadgets or widgets over particular areas of a television screen. The browser may read standard mark up code, such as HTML with JavaScript references, and may provided asynchronous operation while data requests are being served in the background via XML data transfer.

A friend manager 370 keeps track of friends for a user or users 370. The friends may be stored as an array of other users with which a first user has identified a relationship. The friends information may be imported, for example, from social networking sites like ORKUT or MYSPACE so that a user need not recreate their main list, and so that a user's various friends lists may be constantly coordinated. Each record in a friends database accessed by friend manager 1529 may include one or more fields reflecting a name of a friend, an identifier for the friend (e.g., a log in ID or e-mail address), an image associated with the friend (e.g., a photo of the friend or a picture otherwise selected by the friend to be representative of them), and any other information needed to receive recommendations for media files from friends and to provide such recommendations to friends.

Portable program modules 355a-c may also be shown over or next to a running media program 355 on display 354. The modules, as mentioned above, may carry a number of forms of content, including content that is targeted to the content of the media program 355. The selection of which modules to show may be made by a user, such as by setting up a sidebar of modules similar to the manner of establishing a GOOGLE DESKTOP layout, and/or made be made in whole or in part by the program 355 itself. Also, user-established modules may be replaced periodically and temporarily by program-initiated modules.

In addition, computing structures may be provided to convert existing portable program modules from a format suitable for desktop computers to a format or formats suitable to televisions. In particular, changes in resolution between the two types of displays may require certain amounts of transcoding, as may the differences in typical input mechanisms—i.e., mouse and keyboard vs. remote control.

The transcoding may be fully or partially automatic. In general, the transcoding will involve altering of code, such as standard mark up code, in the module that is responsible for display of information and inputting of information. For example, a first step in transcoding may be to change font sizes for text displayed by a module and images rendered by the module. In addition, mark up code may be added to a module so that four-direction inputs from the pressing of navigation arrows on a remote control may cause an input indicator (e.g., cursor) to move from one input control to another on the displayed module. Where style sheets are provided to control the appearance of the displayed module, the style sheet may be modified appropriately also. In addition, certain changes may be made automatically, with the module displayed to a user in a mocked-up form, so that the user may see the effect of each individual change, and may approve or disapprove of each change, or may access the code to change the change. In addition, changes to the code may be made by a set top box when the code is acquired or at run time, or the display of a module may be affected, e.g., shrunk on a television display, after it is generated from the code. A process for transforming a portable program modules in such a manner is shown, for example, with respect to FIG. 8A below.

The code for the portable program modules may then be stored in a web-accessible database for access by set top boxes. The boxes may be programmed to access a URL associated with a page that shows a selection of available portable program modules, such as clock, weather, or other modules. Such types of available modules may be seen by establishing a GOOGLE user account and a personalized home page, and selecting "add stuff." When a user selects a particular module, the set top box may make a request for the code associated with the module and may download the code to the box.

The modules may incorporate JavaScript that makes requests for data from various sources, using, for example, AJAX techniques. The requests may return data, such as current information data, that may be returned to the module to affect displays of the module, such as when layering the displayed module over operating video.

The displayed modules may be positioned according to a stored mechanism on the set top box. For example, default starting points (e.g., for a lower left corner of a modules) for each module may be established in each corner of the television screen, with the module appearing in a default corner unless the markup code specifies a location. A user may also change the default location, such as in a manner like traditional system that permit movement of a PIP window.

Figure 4:
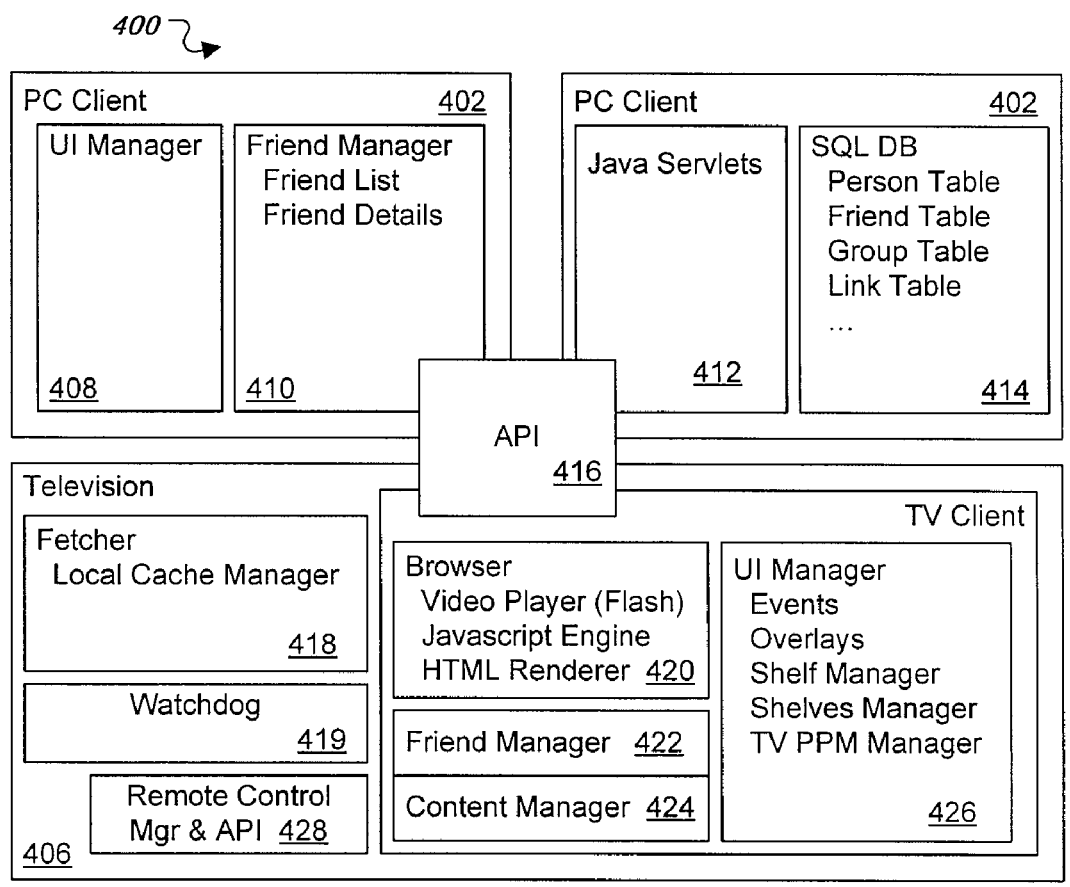
FIG. 4 shows a schematic diagram of a system for sharing and displaying media content.

FIG. 4 shows a schematic diagram of a system 400 for sharing and displaying media content, where the particular components here may represent the portions of the sub-systems shown in FIG. 3A. As discussed, the system 400 generally includes a personal computer client 402, an internet repository 404, and a television 406 running a television client 407—all communicating through a common API 416. The personal computer client 402 permits users to assign content to their own account or to their friends, among many other things. The internet repository 404 keeps track of such content assignments, and of relationships between users (perhaps by requesting information from a separate social networking sub-system). The television client 407 fetches content from the internet repository 404 and accepts inputs from a user with respect to content the user would like to play and content the user would like to share (which involves uploading indicators for such selections to the repository 404).

Referring now more specifically to the personal computer client 402, the client 402 generally includes a small number of elements run in a standard computer operating system. In this example, the elements includes UI manager 408 and a friend manager 410. The friend manager 410 takes a list of friends and related information about the friends from the internet repository, and provides the information for display in a variety of ways. For example, the friends may be sorted by relevance, such as how often the user has shared content with the particular friends. In a like manner, groups and devices may be represented as friends in the system, as discussed with respect to FIG. 2A above. The UI manager 408 may take information from the friend manager 410 and format it for display in a convenient manner for review by a user and for addition of content by the user, such as in the form of gathering application 202 shown in FIG. 2A.

The UI manager may take a variety of forms and may control the manner in which programming is displayed to a user and the manner in which a user interacts with the client 402 in order to share content with their devices and with other users, such as is shown in FIG. 2A.

Referring now to the internet repository 404 of FIG. 4, there again is shown a limited number of components for clarity. However, different and additional components may also be provided. A SQL database 414 is shown as a simple database to store information about relationships between pairs of users and groups, and between users and particular content. For example, the database 414 can store links between users and also links from users to audio-visual content, which may be stored with the internet repository 404 or elsewhere on a network such as the internet. A group of JAVA servlets or other appropriate code may be provided on the internet repository to interact with programs running on the personal computer client 402 and the television client 407, so as to provide functionality like that discussed above and below. Various implementations of the code to interact with the clients may be employed.

Referring now to the television 406 and associated television client 407, there is provided three major applications: a fetcher 418 that scans for links and retrieves the content as a background task; a player as part of a web browser 420 that navigates and presents content; and a watchdog 419 that makes sure everything is running properly. Using the fetcher 418, the client periodically downloads links from the internet repository 404 and resolves them. It compares the recommendation links with a local list to see if the content has already been downloaded. If not, then in a model similar to digital video recorders (DVRs, e.g., TIVO) it copies the video content to the local drive for later personal viewing. Where fetching is done in batch rather than at play time, longer playing, higher quality content may be feasible to download over a connection having restricted speeds. The fetcher 418 is also capable of sending logging information back to the internet repository 404; this also presents an opportunity to use various DRM models (play-once, expire-after, etc.).

The watchdog 419 uses a simple heartbeat model. Each application registers how frequently it sends a message to the watchdog. If the watchdog 419 does not receive a heartbeat consistently, it assumes the application is inoperable, kills any remnant processes, and restarts the application. The watchdog 419 also starts all of the processes on a reboot and accepts commands to terminate all processes.

In this implementation, display of programming occurs through a standard web browser that is displayed using a Flash player with a full-screen window having no borders (or an H.261 player, such as for mobile applications), so as to fill the entire television screen with video. Such a display may also permit the overlay of interactive portable program modules (e.g., gadgets) on top of the playing video, such as by using a JavaScript engine and HTML renderer. A UI manager 426 may be tasked with organizing the overall visual display of the system. In particular, the UI manager 426 may manage the location of items displayed on each shelf in an interface an may also manage the transition from showing bumpers or shelves to displaying an actual program. The UI manager 426 may also manage the manner and location for display of portable program modules such as gadgets or widgets.

A remote control manager 428 having an API may interface with the UI manager 426 to translate restricted inputs that are received from a remote control. For example, selections around a 4-way interface may be interpreted by the television client 407 as directional inputs to be applied to a cursor on the UI display.

A friend manager 422 receives information about friends of a user downloaded from the internet repository 404, either with or without assistance from a more general social networking system. The friend manager 422 presents a list of friends and associated meta data to the UI manager 426 when requested. For example, the UI manager 426 may initially seek information on all of a user's friends, and may then seek detailed information about a particular friend if the user selects that friend on the television screen (e.g., FIG. 1E).

A content manager 424 organizes the content downloaded to the television client 407. For example, the content manager 424 may associate particular pieces of content with particular users, so that, when the UI manager 426 seeks to display a shelf of programs that were recommended by a particular friend, it can get images for such programs via the content manager. Further descriptions of components in an example television client are discussed above with respect to FIG. 3C.

On first examination, the problem of automatically recommending videos is similar to many other recommendation challenges on the web—recommending products to buy based on previous purchases (such as commonly done on Amazon.com), recommending movies to watch (i.e. Netflix.com), or even recommending people to date based on their stated profiles (i.e. Match.com). With respect to the video recommendation task, at a high-level, the approaches can be divided into broad categories.

The first approach is to cluster the items based on item descriptions (i.e. based on the description of the video given by the user who uploaded the item). Then when a user watches a video, other videos in that same cluster can be recommended.

The second approach is to match either explicit or derived descriptions of the user to the keywords describing the videos. For example, if the user often watches videos for which the description includes the words "music", "rap", etc., the system can infer a simple keyword-based preference-vector based on this, and recommend new videos that also contain overlapping terms.

The third approach is "content-agnostic" recommendations. Rather than looking at attributes about the videos, such as keywords, statistics about views of the videos are maintained. For example, a system can keep an anonymized (but unique) id associated with each user; the videos seen are then associated with each user. To provide a recommendation, several options are available. After a video is seen, the system can look at "co-watch" statistics—for users that also saw video-A, what other videos did they also watch? Additionally, the system can limit the set of user from which these statistics are gathered by examining users who are either explicitly stated "friends", or users who are determined to have similar interests (for example, based on approach #2).

A combination of approaches can also be used. Further, all of the approaches can also be used in conjunction with ratings like those gathered on YOUTUBE. It is only when the particular task is examined in detail that it becomes evident that the characteristics of this domain make approach #3 particularly useful. First, the descriptions of the videos are often terse and provide little to categorize videos (i.e. "summer vacation—twins"). Second, generating automatic descriptions of videos is currently beyond the scope of what automatic computer vision/annotation research is capable of. Third, with neither keywords nor higher-level derived semantic descriptions of videos, ascertaining video-content subject similarity is not currently a solvable task (i.e., video-A and video-B are similar in subject matter). However, approach #3, which is con-tent-agnostic, does not rely on content description or subject similarity; instead it relies on robust user-statistics. This fits well with YouTube: as the large number of users, views and ratings, allows us to obtain reliable watching statistics.

At a simplistic level, recommendation systems that are not based on simple keyword matching for this domain can be created by recommending, for user-X, videos that are often watched by other users who have also watched videos that user-X has watched. However, in applying this approach, two problems may immediately arise. First, for popular videos, many copies of the video may be uploaded; there-fore, when recommending videos to watch, it is important to ensure that we not recommend multiple copies of the same video. Further, it is important to calculate "co-watch" statistics on videos which account for duplicates (for example, co-watch statistics should account for the fact that some videos have hundreds of duplicates on-line). Unfortunately, simple matching schemes, which may be based on the assumption that exact matches exist, will not work. Differences in compression, start/stop times, glitches, etc, make exact matches fail. Instead, we have developed methods based on Wavelet-matching to capture inexact matches. Secondly, there will be a problem of recency; when a new video is uploaded, it will not have the same magnitude of co-watch statistics that older videos will; and more users will have seen older videos than a recent video, simply based on the longer time that it has been available. To address this, techniques that age discount recommendation candidates can be used.

In summary, currently recommendation systems that are based on statistics of viewings, rather than in-depth content analysis can be applied to video recommendations. Within the example system here, they may appear to the user as being recommended as another friend, or within a new shelf. Nonetheless, as either more image/video content-analysis tools are developed or more users annotate their videos to ensure searchability of their content, the more other, more traditional content-based recommendations tools will become increasingly effective.

Figure 8A:
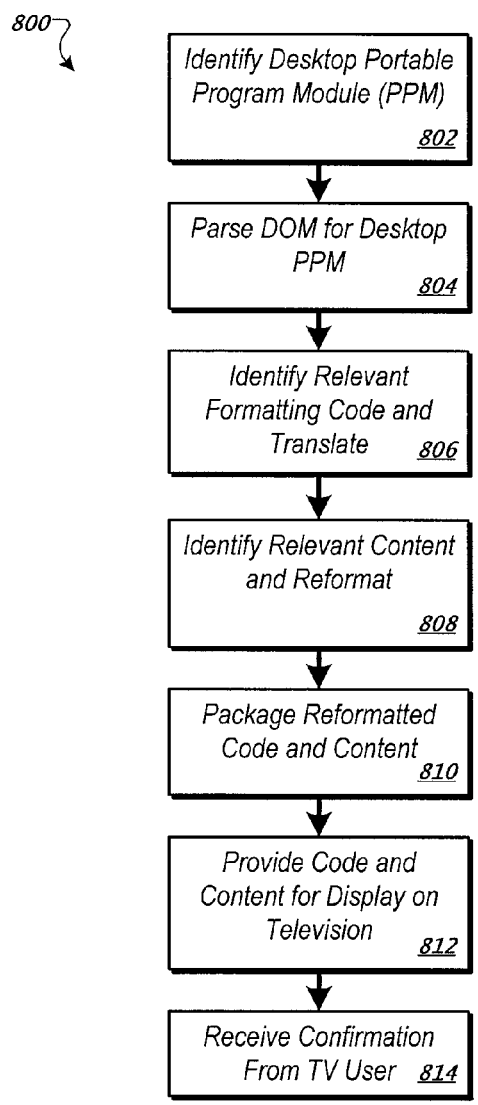
FIG. 8A is a flow chart of a process for converting a portable program module, such as a gadget, from a computer format to a television format.

FIG. 8A is a flow chart of a process 800 for converting a portable program module, such as a gadget, from a computer format to a television format. Such a process may be executed automatically, or semi-automatically, to provide for portable program modules that are appropriate for television display and interaction, from modules that are not so appropriate. In this manner, the vast number of portable program modules, such as gadgets, that have been written and are still being written for the desktop environment, may easily be used in the television environment.

The process begins at box 802, where a desktop portable program modules is initially identified. Such identification may occur via a variety of mechanisms. For instance, a user wishing to have the portable program module displayed on their television may identify the portable program module at a site such as the IGOOGLE set up site. Alternatively, the portable program module may be identified by a browser operating with a television, where the browser attempts to call up the desktop version of the portable program module, and recognizes that it is not fully appropriate for display on a television. In such a situation, the conversion may occur in real time and automatically.

At box 804, the process 800 parses the DOM for the desktop version of the portable program module. Such parsing may give the process 800 more direct access to objects that define the portable program module. The process 800 may then identify relevant formatting code for the page and translate or convert such code (box 806). For example, where the formatting demands a font of a particular size, the process 800 may reduce the size of the font. Also, various objects may be removed form the portable program module if they are determined by the process 800 to be unnecessary. As one example, long textual explanations may be removed, as may images that are determined not to provide additional content to a portable program module (e.g., if they are not selectable or are repetitions of textual content). Such modifications may also involve modifying definitions in style sheets for content in a portable program module.

At box 808, the process 800 identifies relevant content and reformats the content. This reformatting can be distinguished from the reformatting of format, rather than content, in box 806. To reformat content, for example, the portable program module may be looped through using a number of heuristic rules for transformation of a portable program module. For example, a first loop may look for images in the portable program module, and may reduce the pixel size of such images by an amount proportional to the changed that is determined to be needed so as to make the portable program module as visible on a television as it would be on a desktop monitor. Also, there the portable program module is to be converted in aspect ratio (e.g., from 4:3 for a monitor, to 16:9 for a television), the figure may be cropped at its top and bottom or sides, or may have its own aspect ration changed by known mechanisms. A second loop may look for alphanumeric textual content, and may determined that certain strings are too long for display on a television. In such a situation, particular portions of the strings may be excised, and only those portions used in a television-based portable program module (e.g., bolded portions or portions determined to be keywords). Other content may be affected by similar editing rules, which may be implemented automatically Each such automatic reformatting operation may be tested with a user. For example, each change may be stepped through in sequence and displayed to the user, and the user may confirm whether they would like the change to be made or not. The final revised portable program module may then be displayed to the user, either on a television or as if it were on a television, and the user may affirm it or make additional edits to it.

At box 810, the revised portable program module has its code and its content repackaged. Such action may simply result in the generation of relevant HTML, CSS, and JavaScript files, in some examples, in addition to revised image files as noted above. Such files may also be saved together in an appropriate area so that it may be conveniently accessed, such as in a file directory structure that contains television-focused portable program modules, but is parallel in format to a directory structure for corresponding desktop-focused portable program modules.

At box 812, the code and content is provided for display on a television. Such an action may occur by the mechanisms discussed above, such as by a television-based client device making a request for the portable program module at the location in which it has been stored. If the quality of the converted portable program module has not yet been confirmed, then the user of the television may confirm whether the portable program module looks appropriate on a television. At such a point, the portable program module may be made to other users who are using the televisions to view network-based media content as described elsewhere herein.

Figure 8B:
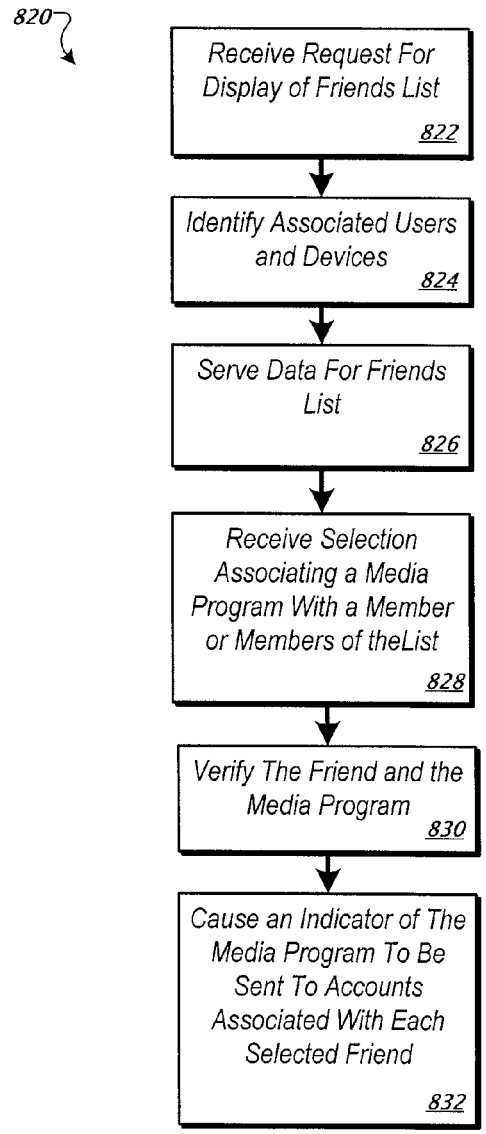
FIG. 8B is a flow chart of a process for sharing audio-visual content among friends and/or devices.

FIG. 8B is a flow chart of a process 820 for sharing audio-visual content among friends and/or devices. The process 820 may be performed, for example, by systems such as those shown in FIGS. 2A-2C and 3A-3C. The process 820 starts at box 822, where a request is received form a user to display a friends list. The request may occur, for example, by the user launching an application such as a chat application or the sharing application 202 of FIGS. 2A-2C. The process 820 may then identify devices and users (e.g., friends) that are associated with the requesting user. Such a determination may be made simply, such as by accessing a profile for the requesting user that includes a list of identifiers for other users and/or devices. The determination may also be made in whole or in part by providing an identifier for the requesting user to a separate social networking system that may then return identification information for the other friends. In one example, the friends information may be provided by a social networking system, and information about a user's other devices may be provided from the user's profile.

The process 820 may then use the retrieved information to serve data for a friends list to an application associated with the user. Such data may include a name of each friend, an identifier for each friend, a photo of each friend, and status information about the friend, such as whether the friend is currently on-line. The application may then use such information to display a toolbar or similar representation, to which the user may drag indicators for media content, such as URLs.

At box 828, the process 820 receives a selection from the user associating a media program with a member or members of the list. Such a selection may occur, for example, by the user dragging from a link for a media file on a web page to a user or users shown with the launched application. The user may also drag a file from a file manager on the user's operating system to the application in a familiar manner, and the file may be uploaded using the application.

At box 830, the information for the friend and media item or program may be verified. For instance, a communication may be made between the client application and a central server that may organize media sharing among friends. The central server may verify that the selected friend or friends are truly friends of the user, and may also verify that the selected media is publicly available.

At box 832, the process 820 causes an indicator of the media program to be sent to accounts associated with each selected friend. For example, with the friends identified using the application, the URL or other information may be copied into a profile associated with each of the friends, where the profile includes lists of friends of the friends, along with URLs that have been recommended by each of the friends. If the media is not fully available to the public (e.g., if it is on the first friend's hard drive), it can be copied to a location in which it will be publicly or partially publicly available, though restrictions on its use (each DRM) may be tracked and limits may be placed on copying in response to such restrictions. If the "friend" is actually a device associated with the recommending user, the URL may be added to a list of programs for the device, and the device or a main system may initiate downloads to the device, such as at a prescribed time each day.

In this manner, a first user may, in a simple manner, see media content and share it easily with their friends. A central system may track relationships among users and recommendations made by first users for second users. The system may also, in appropriate circumstances, manage the delivery of the media to target devices. As a result, users may review content that has been programmed by the friends, who presumably have similar interests to them. In addition, if a group of friends reviews similar content, such shared experience may further enhance the relationships between and among members of the group.

Figure 8C:
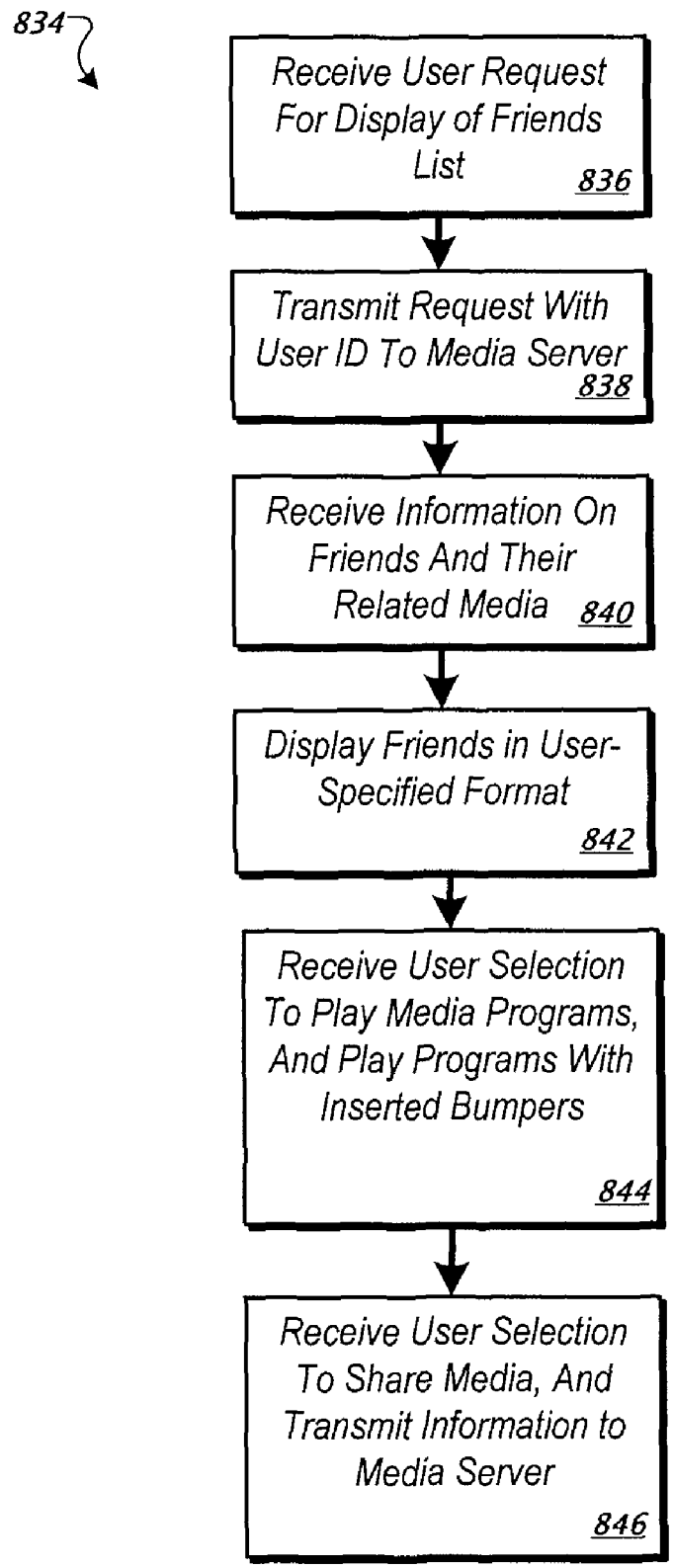
FIG. 8C is a flow chart of a process for sharing audio-visual content among friends.

FIG. 8C is a flow chart of a process for sharing audio-visual content among friends. In general, while FIG. 8B was worded largely in terms of actions that a server might undertake in a media sharing system, FIG. 8C is expressed in terms of actions taken by a client. Of course, the particular actions are provided for example only, and various actions may be performed by clients or servers, as is necessary or convenient.

The process 834 starts at box 836, where a client device receives a user request for the display of a friends list. The device may transmit that request, along with an identifier for the user, to a media server that is remote from the device (box 838), and may in turn receive information on friends of the user and their related media (box 840). For example, the central server may access a profile for the user and may provide information about programs the user has recommended for his or her friends, and/or programs the friends have recommended for the user. Such information may then be displayed in a client application, such as in the manner shown in FIG. 2C (box 842).

A user may then select to play media programs, and to play programs with inserted bumpers, at box 844. In such an example, the user may be acting as a media programmer who is organizing an entire evening of programming, and is thus determining some or all of the advertising to be shown with the programming. When the full programming of all the programs and bumpers is organized by the user, such as when a full evening of programming has been dragged onto a personalized channel and ordered in a proper manner, the client may receive from the user a selection to share the media, and may in response transmit information about the programs to a media server (box 646). Other users that are friends with which the first user wants to share the programming, or subscribers to the user's programming service, may then have identifiers for each of the programmers and bumpers inserted as a list in the friend's user profiles. Alternatively, the programming may be stored once at a central location, and pointers to the programming may be saved for each friend or subscriber.

Figure 8D:
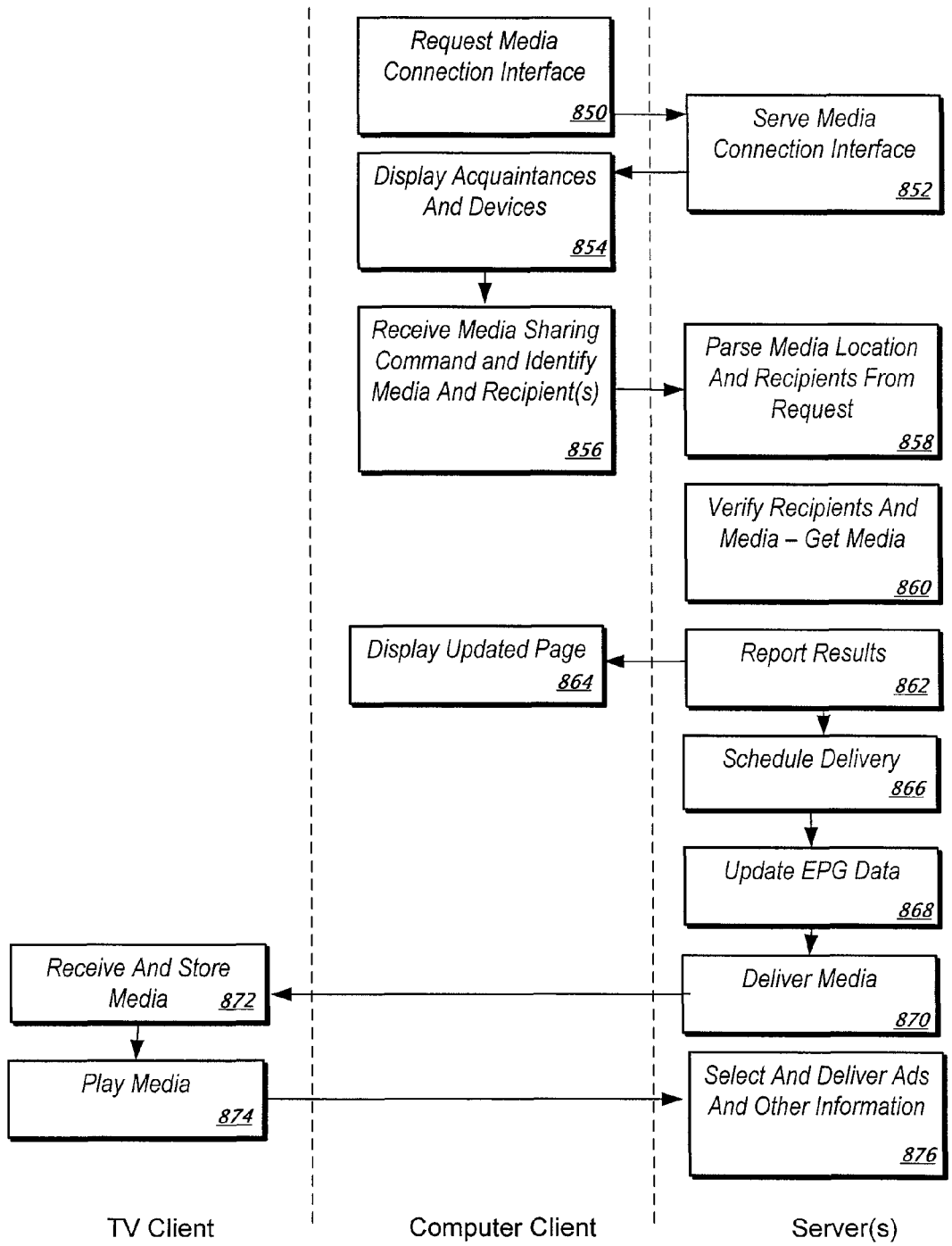
FIG. 8D is a swim lane diagram of a process for sharing audio-visual programs among devices.

FIG. 8D is a swim lane diagram of a process for sharing audio-visual programs among devices. The process here is similar to those just described, but shows example steps that may occur on each main component of a three-component system that includes a television client, a computer client, and a one or more media servers, line those described above. Generally, the process shows steps that may be taken by a user sharing content, from their work computer or smartphone (e.g., during their morning or evening commute), with their home television, and then viewing the content on the television after they get home.

At box 850, a user at a computer client, such as a smartphone or a desktop computer, requests to be provided with a media connection interface, such as the application 202 of FIGS. 2A-2C. Such a request may launch a media sharing application, which may then obtain information for a media connection interface from the server (box 852), and then may use such information to display acquaintances and devices associated with the user (box 854). As the user surfs the web, they may see a variety of interesting information, such as videos that they can watch but do not have the time to watch (perhaps they are on lunch break) or the quality of device to watch (perhaps they are on a bus with their telephone). In such a situation, they may, for example, drag a link to the information to their sharing application or otherwise select the link (e.g., with a right click or other contextual menu selection) so that they can select other users, devices, or groups with which they would like to share the link, and by extension, the information (box 856).

The client may send information, such as identifiers for the recommending user and the users to whom they are making a recommendations, along with information for the link, among other things. The server may parse such a transmission to identify the media location form the URL, and the identities of the users with whom the program is to be shared (box 858). The server may then verify that the recipients are truly friends of the first user, and are also active users with the system, and may get the media, or at least check the address to ensure that the media is at the location (box 860). The server may then report the results of the check back to the client (box 862) and the client may display to the initiating user that the sharing operation was a success or that it encountered errors (box 864).

With the sharing registered, the server may schedule a delivery of the content to the target in certain circumstances (box 866), such as when the target is a device belonging to the initiating user. The scheduling may depend, in the first instance, on a schedule for the user, which may define a permissible window during which the content may be delivered (e.g., before the user gets home from work, or before they wake in the morning, or even before a particular day if they go entire days without watching television).

The system may also update EPG data for the user, at box 868. In particular, if the user, when selecting programs for showing on their home television, is stacking programs one after the other, the programs may be added to a personalized channel on an EPG, with a typical starting time for the user and the lengths of each of the programs and related bumpers controlling the length and timing of the full programming. The media may then be delivered, according to the schedule, from the server to the television client (box 870), and may be stored on a local storage media such at the client (box 872).

Later, when the user returns home, they may access the client to show shelves of programs for them or an EPG for their personalized channel. They may delete certain programs or rearrange them, and may also add programs recommended by their friends, before starting their viewing of the programs. At box 874, the user express a desire to begin watching the programming, and the client begins to play the media. As the media plays, of advertisements or other bumper material has not previously been selected and downloaded, the client may send identifying information for the playing programs to the server, which may select and deliver advertisements and other information for the user (box 876). For example, interesting facts about a program that have been generated by a fan of the program may be popped up during the playing of the program, using, for example a portable program module such as a gadget. Alternatively, or in addition, advertisements may be selected according to key words that have been associated with the program. For example, if the program has a "cars" tag, then advertisements from auto supply companies or automobile manufacturers may be displayed in the bumpers.

The next portion of this document describe related work in this area. Work in the area of Interactive TV (ITV) has been going on for years. Much of the work has been on personalized televisions especially around personal Electronic Program Guides (pEPGs). From a hardware platform and networked media standpoint, most work has been done around Personal Video Recorders (PVRs or DVRs), media centers, and more generally set top boxes (STBs). For example, the MICROSOFT MEDIA CENTER runs on PCs and computers-turned-PVRs. This system also integrates with game consoles such as the XBOX 360, allowing the streaming and transfer of files.

While these devices are arguably the hardware convergence of computers and televisions, they do not adequately address the convergence, collision, and collaboration of the user's different activities in these different environments. The operations to collect and share are hidden and not part of the main activity flow, but are instead relegated to a number of third-party applications in the backwaters of the system.

To evolve these systems, we look at activities models, and attempt to integrate and improve them across the platforms. Underlying the model described here, which is a particular implementation described and shown here, is a variant on the Collect-Relate-Create-Donate (CRCD) model. The system makes the ability to collect and donate on different platforms simple and a first class participant.

To understand what people do and how they watch TV, we refer to Lee, B. and Lee, R., "How and Why People Watch TV: Implications for the Future of Interactive Television," *J. of Advertising Research*, 35(6) (1995) and Lull, J., "Inside Family Viewing: Ethnographic Research on Television's Audiences," London: Routledge, pp. 49-61 (1990). Lull identified six uses of television as extensions of the household:

Environment (background noise, companionship)
Regulate (punctuate time, regulate activities)

Communicate (illustrate experience, common ground, reduce anxiety)

Affiliate (verbal contact, family relaxing, reduce domestic conflict)

Social learning (model behavior, solve problems, make consumer decisions)

Competence (re-enforce roles, validation, facilitate arguments, family solidarity).

The ability to create a playlist (or shelf) allows you to customize it towards social needs—for example, building a channel of educational video for your children and watching them as a family. See Chorianopolous, K., "The Digital Set-Top Box as a Virtual Channel Provider," in SIGCHI '03 (Ape. 5-10, Fort Lauderdale, Fla.), ACM/SIGCHI, 2003, pp. 666-67 for earlier work in virtual channels. And the concept of shelves as a metaphor for information access has been around per Card, S. et al., "The WebBook and the WebForager: an Information Workspace for the World-Wide Web," *Proceedings of the SIGCHI* 96, p. 111 (Apr. 13-18, 1996). Other work related to this includes Phiz (Rowson, J. et al., "Discovering TVs Long Tail Through a Channel-Centric Model," EuroITV 2005, Mar. 30-Apr. 1, 2005 (also HP Technical Report: HPL-2005-84) and Joost (http://www.joost.com). Phiz is an example of creating custom TV that retains the traditional channel-based model. Joost is an example of having the TV model on your PC. Finally, the XBox 360 is a game-centric platform that has expanded to include watching HQ video content (full length movies) and collaborating with fellow gamers.

Figure 9:
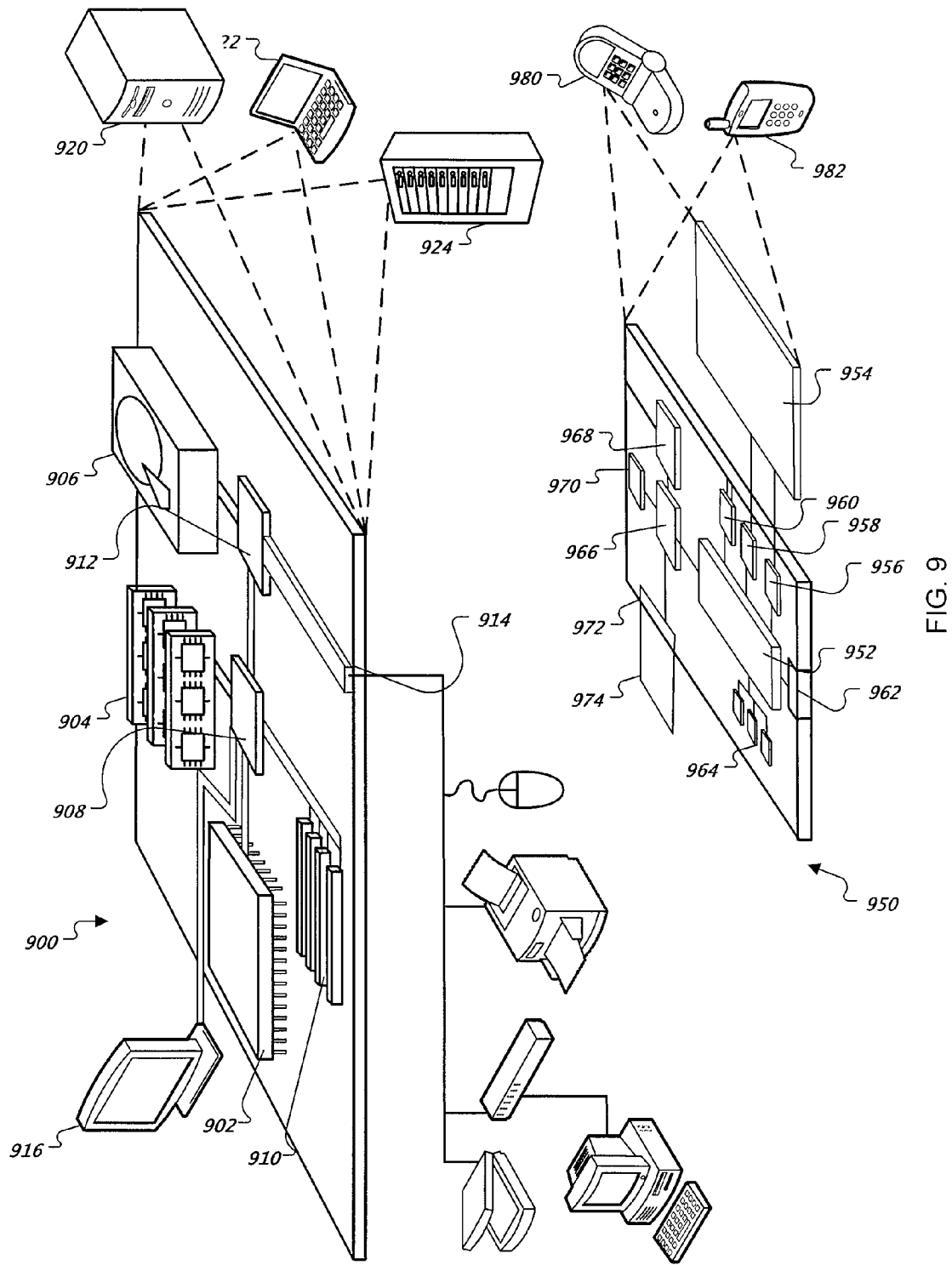
FIG. 9 shows an example of a generic computer device and a generic mobile computer device.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the systems and methods have been described; it should be recognized that numerous other applications are contemplated. Moreover, although many of the embodiments have been described in relation to televisions, that term should be understood to include various forms of mechanisms for moving video and other content. Accordingly, other embodiments are within the scope of the following claims.

What is claimed is:

1. A computer-implemented method of sharing media content, comprising:
   displaying a media program on a television and receiving, from a viewer of the television, a command to share a recommendation of the media program with one or more friends;
   displaying indicators for a plurality of friends associated with a user;
   receiving a selection of the one or more friends, from the plurality of friends, to which the viewer would like to share the recommendation of the media program; and
   in response to the command to share the recommendation of the media program with the one or more friends:
      transmitting an indication soliciting a comment for the media program from a computing device that is in direct communication with the television to a mobile device of the viewer, wherein the mobile device is separate from the television;
      receiving at the computing device and from the mobile device the comment that was authored by the viewer in response to the indication soliciting the comment; and
      causing (i) the recommendation of the media program displayed on the television to be sent to one or more accounts associated with the one or more friends, and (ii) at least part of the comment to be sent to the one or more accounts associated with the one or more friends.

2. The method of claim 1, wherein the indicators for a plurality of friends each comprise a name of a friend and an image associated with the friend.

3. The method of claim 1, further comprising contacting a social networking site to obtain information identifying the plurality of friends.

4. The method of claim 1, wherein the recommendation of the media program comprises a URL pointing to a file of the program.

5. The method of claim 1, further comprising displaying a plurality of programs recommended by friends of the viewer.

6. The method of claim 5, wherein the programs are displayed as icons in shelves organized by friends.

7. The method of claim 1, further comprising:
   automatically generating, by the computing device and in response to receiving the selection, a message that solicits the comment from the viewer; and
   transmitting from the computing device and to the mobile device for display by the mobile device the message that solicits the comment from the viewer.

8. The method of claim 7, wherein:
   the selection of the one or more friends is received at the computing device, and
   the indicators for the plurality of friends are displayed on the television.

9. The method of claim 1, wherein the viewer is the user.

10. A computer program product tangibly embodied in a non-transitory machine-readable storage device and comprising instructions that, when executed by a processor, perform operations comprising:
    displaying a media program on a television and receiving, from a viewer of the television, a command to share a recommendation of the media program with one or more friends;
    displaying indicators for a plurality of friends associated with a user;
    receiving a selection of the one or more friends, from the plurality of friends, to which the viewer would like to share the recommendation of the media program; and
    in response to the command to share the recommendation of the media program with the one or more friends:
       transmitting an indication soliciting a comment for the media program from a computing device that is in direct communication with the television to a mobile device of the viewer, wherein the mobile device is separate from the television;
       receiving at the computing device and from the mobile device the comment that was authored by the viewer in response to the indication soliciting the comment; and
       causing (i) the recommendation of the media program displayed on the television to be sent to one or more accounts associated with the one or more friends, and (ii) at least part of the comment to be sent to the one or more accounts associated with the one or more friends.

11. The computer program product of claim 10, wherein the indicators for a plurality of friends each comprise a name of a friend and an image associated with the friend.

12. The computer program product of claim 10, wherein the operations further comprise contacting a social networking site to obtain information identifying the plurality of friends.

13. The computer program product of claim 10, wherein the recommendation of the media program comprises a URL pointing to a file of the program.

14. The computer program product of claim 10, wherein the operations further comprise displaying a plurality of programs recommended by friends of the viewer.

15. The computer program product of claim 14, wherein the programs are displayed as icons in shelves organized by friends.

16. The computer program product of claim 10, wherein the operations further comprise:
    automatically generating, by the computing device and in response to receiving the selection, a message that solicits the comment from the viewer; and
    transmitting from the computing device and to the mobile device for display by the mobile device the message that solicits the comment from the viewer.

17. The computer program product of claim 16, wherein:
    the selection of the one or more friends is received at the computing device, and
    the indicators for the plurality of friends are displayed on the television.

18. The computer program product of claim 10, wherein the viewer is the user.

19. A system comprising:
    a non-transitory computer-readable storage device comprising instructions; and
    one or more processors coupled to the non-transitory computer-readable storage device and configured to execute the instructions to perform operations comprising:
       displaying a media program on a television and receiving, from a viewer of the television, a command to share a recommendation of the media program with one or more friends;
       displaying indicators for a plurality of friends associated with a user;

receiving a selection of the one or more friends, from the plurality of friends, to which the viewer would like to share the recommendation of the media program; and in response to the command to share the recommendation of the media program with the one or more friends:

transmitting an indication soliciting a comment for the media program from a computing device that is in direct communication with the television to a mobile device of the viewer, wherein the mobile device is separate from the television;

receiving at the computing device and from the mobile device the comment that was authored by the viewer in response to the indication soliciting the comment; and causing (i) the recommendation of the media program displayed on the television to be sent to one or more accounts associated with the one or more friends, and (ii) at least part of the comment to be sent to the one or more accounts associated with the one or more friends.

20. The system of claim 19, wherein the indicators for a plurality of friends each comprise a name of a friend and an image associated with the friend.

21. The system of claim 19, wherein the operations further comprise contacting a social networking site to obtain information identifying the plurality of friends.

22. The system of claim 19, wherein the recommendation of the media program comprises a URL pointing to a file of the program.

23. The system of claim 19, wherein the operations further comprise displaying a plurality of programs recommended by friends of the viewer.

24. The system of claim 23, wherein the programs are displayed as icons in shelves organized by friends.

25. The system of claim 19, wherein the operations further comprise:

automatically generating, by the computing device and in response to receiving the selection, a message that solicits the comment from the viewer; and transmitting from the computing device and to the mobile device for display by the mobile device the message that solicits the comment from the viewer.

26. The system of claim 25, wherein:

the selection of the one or more friends is received at the computing device, and the indicators for the plurality of friends are displayed on the television.

27. The system of claim 19, wherein the viewer is the user.

* * * * *